US010713699B1

(12) United States Patent
Lien et al.

(10) Patent No.: US 10,713,699 B1
(45) Date of Patent: Jul. 14, 2020

(54) GENERATION OF GUIDE MATERIALS

(71) Applicant: Andersen Corporation, Bayport, MN (US)

(72) Inventors: Jeffrey R. Lien, Clayton, WI (US); Justin M. Glorvigen, Coon Rapids, MN (US); Jerry L. Berget, New Richmond, WI (US); Brian A. Cianciolo, Eau Claire, WI (US)

(73) Assignee: Andersen Corporation, Bayport, MN (US)

( * ) Notice: Subject to any disclaimer, the term of this patent is extended or adjusted under 35 U.S.C. 154(b) by 609 days.

(21) Appl. No.: 14/940,898

(22) Filed: Nov. 13, 2015

Related U.S. Application Data

(60) Provisional application No. 62/079,884, filed on Nov. 14, 2014.

(51) Int. Cl.
*G06F 3/00* (2006.01)
*G06Q 30/06* (2012.01)
(Continued)

(52) U.S. Cl.
CPC ....... *G06Q 30/0621* (2013.01); *G06F 3/0484* (2013.01); *G06F 3/04842* (2013.01); *G06F 3/04847* (2013.01); *G06F 7/76* (2013.01); *G06F 16/1748* (2019.01); *G06F 16/185* (2019.01); *G06F 16/20* (2019.01); *G06F 16/21* (2019.01); *G06F 16/2228* (2019.01); *G06F 16/2428* (2019.01); *G06F 16/24564* (2019.01); *G06F 16/284* (2019.01); *G06Q 10/087* (2013.01); *G06Q 30/0627* (2013.01); *G06Q 30/0643* (2013.01)

(58) Field of Classification Search
CPC .... G06F 3/04842; G06F 3/0484; G06F 17/30; G06F 3/0482; G06F 16/284; G06F 16/21; G06F 16/2228; G06F 16/2428; G06F 16/20; G06F 16/24564; G06F 7/76; G06F 16/185; G06F 16/1748; G06Q 30/0643; G06Q 10/087; G06Q 30/0621; G06Q 30/0627
See application file for complete search history.

(56) References Cited

U.S. PATENT DOCUMENTS 4,916,637 A * 4/1990 Allen ...................... G06F 1/181
700/104
5,446,653 A * 8/1995 Miller .................... G06Q 40/02
705/4
(Continued)

*Primary Examiner* — Ajay M Bhatia
*Assistant Examiner* — Jennifer E Nichols
(74) *Attorney, Agent, or Firm* — Shumaker & Sieffert, P.A.

(57) ABSTRACT

Systems and methods for generating customized guide materials associated with a product include a computing device that receives user input information associated with the product. The user input information includes a plurality of user selected options. A plurality of rules define the relationships between each specific combination of user selectable options a pre-defined set of guide modules from among a plurality of guide modules that are relevant to that specific combination of options selected by the user. The guide modules may include textual information, image information, audio information and/or video information. The customized guide materials are generated based on the pre-defined set of guide modules, and may be output for presentation on a user computing device.

29 Claims, 27 Drawing Sheets

(51) Int. Cl.
*G06F 3/0484* (2013.01)
*G06F 16/21* (2019.01)
*G06F 16/28* (2019.01)
*G06F 16/20* (2019.01)
*G06F 16/22* (2019.01)
*G06F 16/242* (2019.01)
*G06F 16/174* (2019.01)
*G06F 7/76* (2006.01)
*G06F 16/185* (2019.01)
*G06F 16/2455* (2019.01)
*G06Q 10/08* (2012.01)

(56) References Cited

U.S. PATENT DOCUMENTS

| | | | |
|---|---|---|---|
| 5,551,030 A * | 8/1996 | Linden | G06F 9/45512 |
| 5,630,125 A * | 5/1997 | Zellweger | G06F 16/904 |
| 5,809,287 A | 9/1998 | Stupek, Jr. et al. | |
| 5,825,651 A * | 10/1998 | Gupta | G06Q 10/06 700/103 |
| 6,091,930 A * | 7/2000 | Mortimer | G09B 5/14 434/118 |
| 6,182,095 B1 * | 1/2001 | Leymaster | G06F 40/174 715/236 |
| 6,272,508 B1 * | 8/2001 | Dyne | G06F 40/58 715/210 |
| 6,370,498 B1 * | 4/2002 | Flores | G06F 40/45 704/3 |
| 6,377,956 B1 * | 4/2002 | Hsu | G06F 8/73 |
| 6,587,748 B2 | 7/2003 | Baack | |
| 6,915,253 B1 * | 7/2005 | Chapman | G06F 9/4411 703/20 |
| 7,155,452 B2 * | 12/2006 | Minowa | G06Q 10/063112 |
| 7,200,583 B1 * | 4/2007 | Shah | G06F 30/00 706/47 |
| 7,292,987 B2 * | 11/2007 | Flanagan | G06F 40/14 705/345 |
| 7,401,097 B1 * | 7/2008 | Baer | G06F 40/14 |
| 7,461,049 B2 * | 12/2008 | Thompson | G06Q 30/02 |
| 7,500,237 B1 * | 3/2009 | Saiyed | G06F 8/34 717/174 |
| 7,613,993 B1 * | 11/2009 | Baer | G06F 40/226 715/205 |
| 7,650,296 B1 * | 1/2010 | Brunner | G06Q 30/06 705/26.5 |
| 7,661,124 B2 * | 2/2010 | Ramanathan | H04L 41/0893 709/218 |
| 7,823,062 B2 * | 10/2010 | Liberty | G06Q 10/06 715/234 |
| 7,849,392 B2 * | 12/2010 | Rapp | G06Q 10/10 715/200 |
| 8,108,773 B2 * | 1/2012 | Fernstrom | G06F 40/186 715/273 |
| 8,463,821 B2 * | 6/2013 | Lubbers | G06F 16/986 707/802 |
| 8,515,820 B2 | 8/2013 | Lopez et al. | |
| 8,578,265 B2 * | 11/2013 | Bajohr | G06F 40/166 715/235 |
| 8,913,878 B2 * | 12/2014 | Axen | G11B 27/031 386/280 |
| 9,015,030 B2 * | 4/2015 | Hunter | G06F 40/40 704/3 |
| 9,053,190 B1 * | 6/2015 | Boenau | G06F 16/9535 |
| 9,098,854 B2 * | 8/2015 | Lin | G06F 8/20 |
| 9,459,780 B1 * | 10/2016 | Smith | G06F 9/453 |
| 9,466,026 B2 * | 10/2016 | Hettenkofer | G06N 5/025 |
| 9,595,021 B2 * | 3/2017 | Bennett | G06F 40/186 |
| 2001/0056384 A1 * | 12/2001 | Matsumura | G06Q 30/0601 705/26.1 |
| 2002/0026459 A1 * | 2/2002 | Fernandez | G06Q 30/02 715/222 |
| 2002/0055922 A1 * | 5/2002 | Minowa | G06Q 10/063112 |
| 2002/0073001 A1 * | 6/2002 | Palmer | G06Q 10/0875 705/29 |
| 2002/0082953 A1 * | 6/2002 | Batham | G06Q 30/0625 705/26.62 |
| 2002/0087423 A1 * | 7/2002 | Carbrey Palango | G06Q 10/087 705/26.5 |
| 2002/0165701 A1 * | 11/2002 | Lichtenberg | G06F 30/15 703/7 |
| 2003/0040899 A1 * | 2/2003 | Ogilvie | G09B 19/06 704/2 |
| 2003/0126129 A1 * | 7/2003 | Watson | G06F 40/12 |
| 2003/0172002 A1 * | 9/2003 | Spira | G06Q 10/10 705/26.1 |
| 2004/0122853 A1 * | 6/2004 | Moore | G06Q 10/06 |
| 2004/0205645 A1 * | 10/2004 | Hoffman | G06F 40/174 715/255 |
| 2004/0205656 A1 * | 10/2004 | Reulein | G06F 40/154 715/255 |
| 2004/0221239 A1 * | 11/2004 | Hachigian | G09B 7/02 715/762 |
| 2005/0138078 A1 * | 6/2005 | Christenson | G06Q 30/02 |
| 2005/0203809 A1 * | 9/2005 | Stone | G06Q 30/0631 705/7.19 |
| 2006/0242569 A1 * | 10/2006 | Grigoriadis | G06F 40/186 715/205 |
| 2006/0271876 A1 * | 11/2006 | Holmes | G06F 3/04847 715/771 |
| 2007/0028229 A1 | 2/2007 | Knatcher | |
| 2009/0100381 A1 * | 4/2009 | McAfee | G06Q 30/02 715/855 |
| 2009/0144175 A1 * | 6/2009 | Penaflor | G06Q 10/043 705/26.1 |
| 2009/0164490 A1 * | 6/2009 | Wininger | G06Q 10/06 |
| 2009/0241015 A1 * | 9/2009 | Bender | G06F 40/103 715/202 |
| 2009/0259953 A1 * | 10/2009 | Jannott | G06Q 10/06 715/762 |
| 2010/0114995 A1 * | 5/2010 | Kopp | G06F 40/226 707/811 |
| 2011/0153575 A1 * | 6/2011 | Glasser | G06F 16/2465 707/690 |
| 2011/0208801 A1 * | 8/2011 | Thorkelsson | H04L 67/2814 709/203 |
| 2011/0296364 A1 * | 12/2011 | Chen | G06F 30/39 716/122 |
| 2011/0307100 A1 * | 12/2011 | Schmidtke | G06F 30/00 700/276 |
| 2012/0101918 A1 * | 4/2012 | Battle | G06Q 30/00 705/26.63 |
| 2012/0150680 A1 * | 6/2012 | Golus | G06Q 30/0603 705/26.5 |
| 2012/0198365 A1 * | 8/2012 | Bornheimer | G06F 8/38 715/762 |
| 2012/0209892 A1 * | 8/2012 | MacAskill | G06F 16/50 707/812 |
| 2012/0249542 A1 * | 10/2012 | Park | G06F 3/04815 345/419 |
| 2013/0018850 A1 * | 1/2013 | Houlihan | G06F 16/212 707/690 |
| 2013/0060801 A1 * | 3/2013 | Beaver, III | G06T 19/00 707/758 |
| 2013/0061138 A1 * | 3/2013 | Spector | G06F 40/10 715/256 |
| 2013/0091409 A1 * | 4/2013 | Jeffery | G06F 16/4393 715/202 |
| 2013/0226954 A1 * | 8/2013 | Lukez | G06Q 10/10 707/769 |
| 2013/0253901 A1 * | 9/2013 | Krack | G06F 40/40 704/2 |
| 2013/0299569 A1 * | 11/2013 | Gentile | G06Q 10/0833 235/375 |
| 2014/0026113 A1 * | 1/2014 | Farooqi | G06F 8/34 717/107 |
| 2014/0095344 A1 * | 4/2014 | Christenson | G06Q 30/02 705/26.5 |

(56) References Cited

U.S. PATENT DOCUMENTS

| | | | |
|---|---|---|---|
| 2014/0101638 A1* | 4/2014 | Braun | G06F 8/73 717/123 |
| 2014/0108942 A1* | 4/2014 | Freeman | G06Q 30/0631 715/738 |
| 2014/0180970 A1* | 6/2014 | Hettenkofer | G06N 5/025 706/11 |
| 2014/0278268 A1* | 9/2014 | Woolsey | G06Q 10/06 703/1 |
| 2015/0032440 A1* | 1/2015 | Hale | G06F 40/58 704/3 |
| 2015/0120389 A1* | 4/2015 | Zhang | G06Q 10/10 705/7.32 |
| 2015/0234893 A1* | 8/2015 | Kaasten | G06F 16/284 707/754 |
| 2017/0243168 A1* | 8/2017 | Sitaram | G06Q 10/1057 |

* cited by examiner

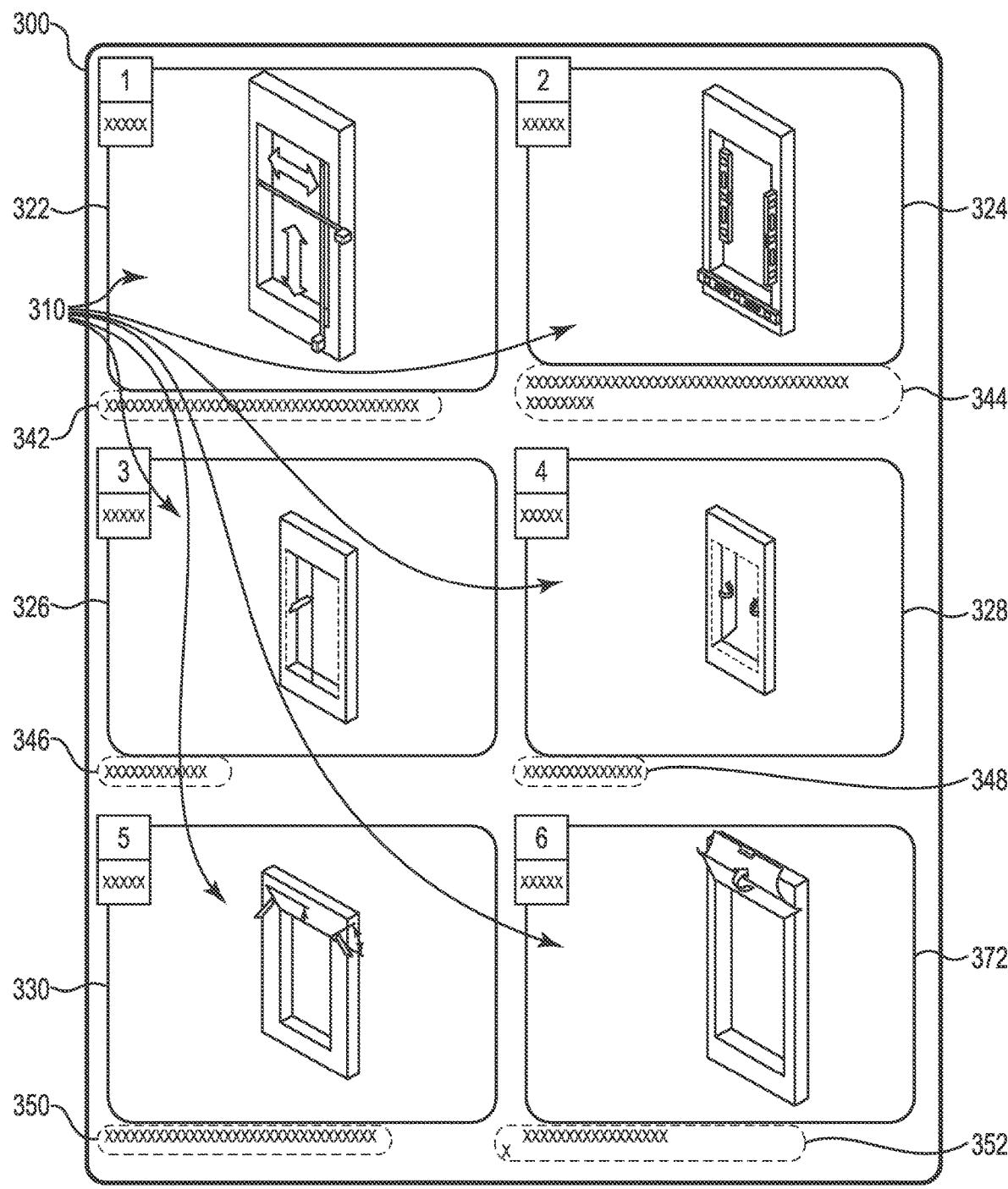

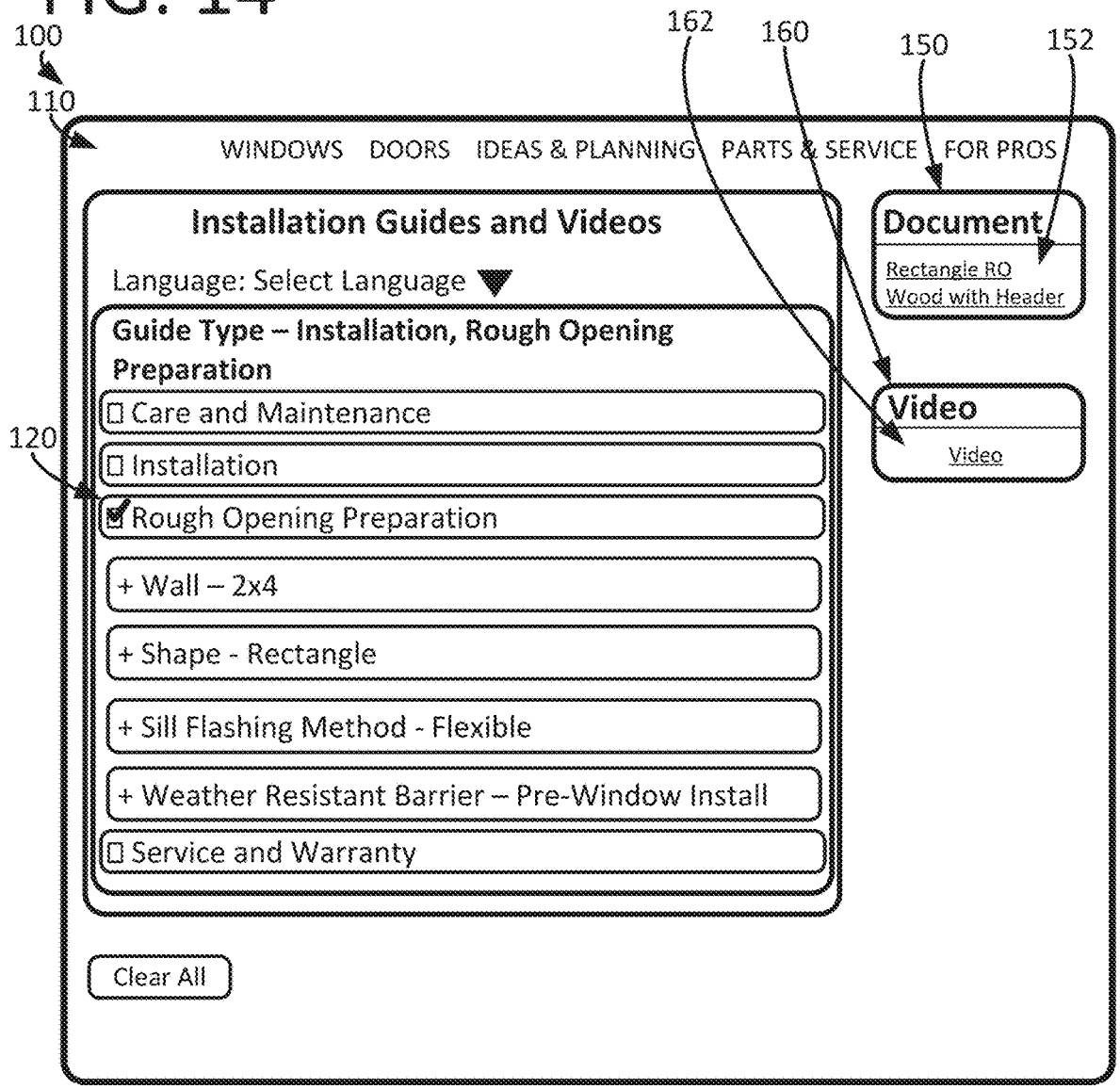

GENERATION OF GUIDE MATERIALS

This application claims the benefit of U.S. Provisional Application 62/079,884 filed Nov. 14, 2014, the entire contents of which are incorporated herein by reference.

TECHNICAL FIELD

The disclosure herein relates to guide material generation systems, methods, and interfaces. More particularly, this disclosure relates to systems, methods, and graphical user interfaces configured to generate guide materials for use in the installation of doors and windows.

BACKGROUND

Manufacturers of windows and doors often provide their products with guide materials such as paper manuals. For example, the guide materials may be provided in a box containing the door or window. Each different window or door may have a different set of guide materials associated therewith, e.g., containing specific instructions, warranty information, etc. for each different window or door. Further, each set of guide material may include multiple sections covering various topics in one or more languages.

SUMMARY

In one example, the disclosure is directed to a method of generating customized guide materials associated with a product, comprising receiving, by a computing device, user input information associated with the product, the user input information including a plurality of user selected options from among a plurality of user selectable options, identifying, by the computing device and based on the plurality of user selected options, a pre-defined set of guide modules corresponding to the plurality of user selected options from among a plurality of guide modules, wherein each of the plurality of guide modules includes at least one of text information, image information, audio information and video information, and generating, by the computing device, the customized guide materials based on the identified pre-defined set of guide modules.

In some examples, the method may further comprise transmitting the customized guide materials to a user computing device. In some examples, the method may further comprise generating, for display on a user computing device, a graphical user interface configured to present the plurality of user selectable options and to receive the plurality of user selected options. In some examples, the plurality of user selectable options include a language option or a guide category. In some examples, the product may include a window or a door, and the plurality of user selectable options may include at least one of a product identifier, a window type, a door type, a shape, a wall construction type, and a framing material type.

In another example, the disclosure is directed to a computing system configured to generate customized guide materials associated with a product, comprising one or more processors configured to receive user input information associated with the product, the user input information including a plurality of user selected options from among a plurality of user selectable options, storage media configured to store a plurality of guide modules, wherein each of the plurality of guide modules includes at least one of text, image, audio and video guide information corresponding to the product, the one or more processors further configured to identify, based on the plurality of user selected options, a pre-defined set of guide modules corresponding to the plurality of user selected options from among a plurality of guide modules, wherein each of the plurality of guide modules includes at least one of text, image, audio and video guide information corresponding to the product, and generate the customized guide materials based on the identified pre-defined set of guide modules.

In some examples, the storage media is further configured to store a plurality of rules that relate each possible combination of the plurality of user selected options with one of a plurality of pre-defined sets of guide modules.

In another example, the disclosure is directed to a non-transitory computer readable medium encoded with instructions that cause one or more processors of a computing device to perform operations comprising receive user input information associated with the product, the user input information including a plurality of user selected options from among a plurality of user selectable options, identify, based on the plurality of user selected options, a pre-defined set of guide modules corresponding to the plurality of user selected options from among a plurality of guide modules, wherein each of the plurality of guide modules includes at least one of text, image, audio and video guide information corresponding to the product, and generate the customized guide materials based on the identified pre-defined set of guide modules.

In another example, the disclosure is directed to a computing system configured to generate customized guide materials associated with a product, comprising means for receiving, by a computing device, user input information associated with the product, the user input information including a plurality of user selected options from among a plurality of user selectable options, means for identifying, based on the plurality of user selected options, a pre-defined set of guide modules corresponding to the plurality of user selected options from among a plurality of guide modules, wherein each of the plurality of guide modules includes at least one of text, image, audio and video guide information corresponding to the product, and means for generating the customized guide materials based on the identified pre-defined set of guide modules.

The details of one or more examples are set forth in the accompanying drawings and the description below. Other features and/or advantages will be apparent from the description and drawings, and from the claims.

BRIEF DESCRIPTION OF THE DRAWINGS

FIGS. 12A-12E are conceptual diagrams illustrating an exemplary customized textual and graphical guide generated using the graphical user interface of FIG. 11.

FIG. 14 is a conceptual diagram illustrating an exemplary graphical user interface for providing customized guide materials including user selections in the "rough opening" guide category.

DETAILED DESCRIPTION

Figure 1:
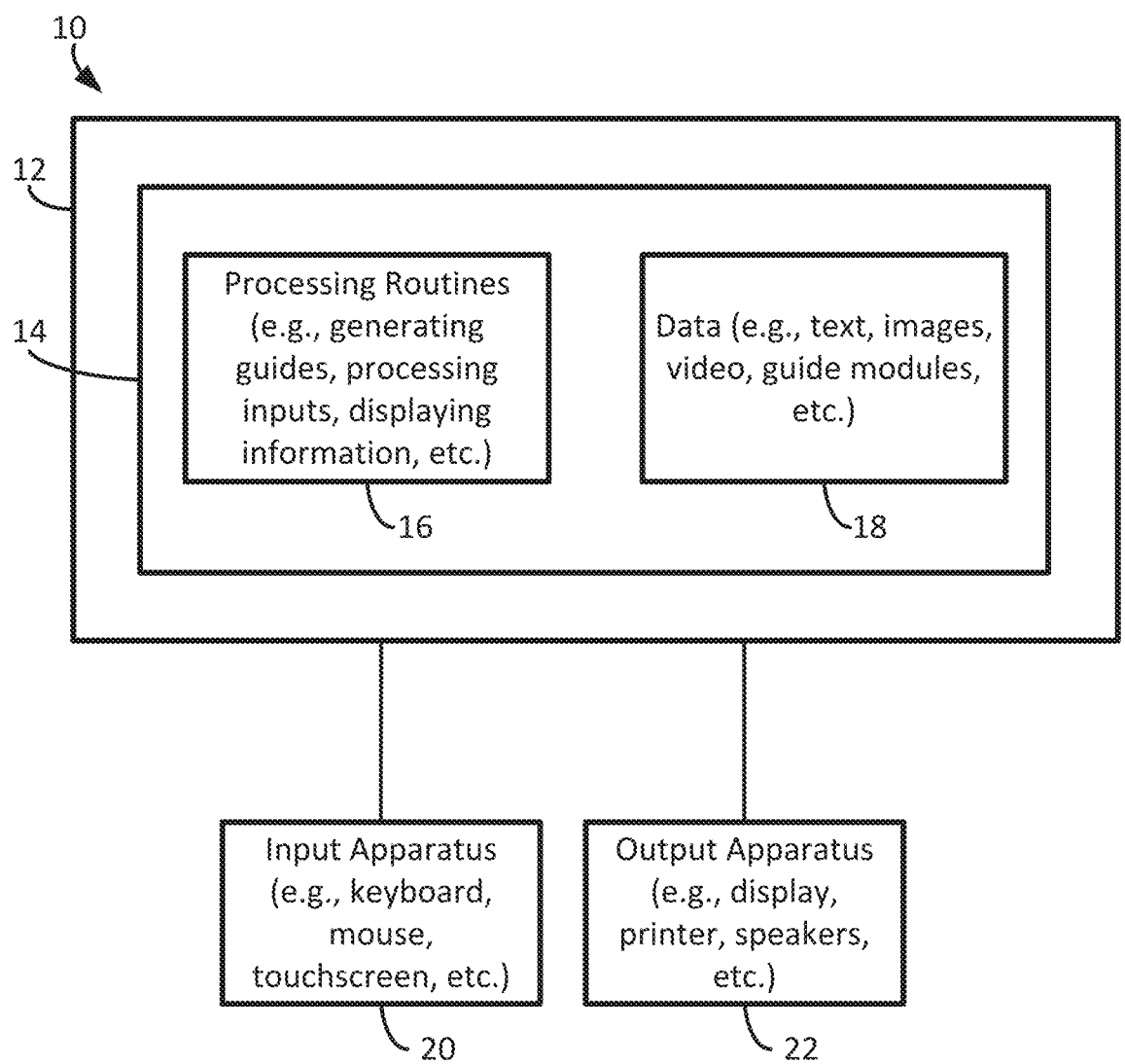
FIG. 1 is a block diagram of an exemplary system including an input apparatus and a display apparatus that may utilize user interfaces and methods described herein for generation of guide materials.

In the following detailed description of illustrative examples, reference is made to the accompanying figures of the drawing which form a part hereof, and in which are shown, by way of illustration, specific examples which may be practiced. It is to be understood that other examples may be utilized and structural changes may be made without departing from (e.g., still falling within) the scope of the disclosure presented herein.

Manufacturers of windows and doors or other products often provide their products with guide materials such as paper manuals. For example, the guide materials may be provided in a box containing the door or window. Guide materials included with a product such as windows or doors may be intended to cover multiple different products, and to be understood by a wide variety of different users, and may therefore include portions that are not relevant to the particular product at hand or for a particular user. These comprehensive guide materials may further include multiple sections covering various topics for multiple products in one or more languages, further increasing the amount of guide material included with each product that may be irrelevant to the particular product at hand or for a particular user.

The inclusion of comprehensive guide materials (e.g., multiple steps or processes that may or may not be relevant to the particular product, each provided in multiple languages) may be wasteful (e.g., waste of materials, waste of energy) and cumbersome (e.g., assuring that all pages of the guide materials are included in a box). Further, the comprehensive guide materials may be burdensome to update or revise when one or more steps, or parts, of the guide materials should be changed. For example, when a single step or portion of an installation process for a window or door is changed, the entire guide for each different type of window or door, and for each different language, may need to be revised or updated. Further, manufactured doors and windows that have been shipped out may have the guide materials included therewith, and updating such materials may be burdensome (e.g., removal of the guide materials from the box, replacing the guide materials with new guide materials, notifying a retailer or customer that a change has occurred). Additionally, printed guide materials may be less desirable as the proliferation of cheap, durable electronic devices capable of storing and displaying guide materials increases. Further, more technologically-savvy users may increasingly desire electronic guide materials such as video and/or electronic documents that may be displayed on a mobile computing device such as a laptop computer, tablet computer, or smart phone as opposed to printed guide materials.

In the case of electronic guide materials, storing comprehensive guide materials for each type of product may consume large amounts of data storage space. Significant time and effort may also be required revise or update the electronic guide materials, presenting further computational, revision tracking and data storage challenges.

The present disclosure describes systems and methods that provide graphical user interfaces to generate customized guide materials (e.g., materials related to one or more doors or windows, etc.) based on input by user to provide the specific guide materials that the user desires. The graphical user interfaces may display a plurality of options relating to the doors and windows, and may allow a user to select one or more of the plurality of options. The selected options may be used to generate guide materials for the user that are tailored, or customized, to the user's wishes. For example, a user may choose to not include "care and maintenance" materials for a window (e.g., because the user only wants the guide materials related specifically to the immediate installation of the window), and thus, the exemplary systems and methods may generate guide materials without the "care and maintenance" materials. At a later time (e.g., after installation of the window), the user may again use the graphical user interface provided by the exemplary systems and methods to generate, or provide, guide materials including the "care and maintenance" materials without the installation guide materials.

The exemplary systems, methods, and graphical user interfaces may further be configured to provide more than one type of customized guide material. For example, the exemplary systems, methods, and graphical user interfaces may provide electronic alphanumeric and illustrated (text and/or image) guide materials similar to printed guide materials. The electronic alphanumeric and illustrated guide materials may be printed by a user at their convenience (e.g., at home, at work, etc.) or may be displayed on an electronic device (e.g., desktop computer, tablet computer, laptop computer, cellular telephone, etc.). Further, for example, the exemplary systems, methods, and graphical user interfaces may provide electronic guide videos. The electronic guide videos may be displayed on an electronic device (e.g., desktop computer, tablet computer, laptop computer, cellular telephone, etc.). The electronic guide videos may be separated or presented by step or process, i.e., a step or process among a plurality of steps or processes associated with guide material for a door or window, such that, e.g., a user may select the step or process, or steps or processes, that the user would like to view. In other words, a user may "skip-ahead" or select any step or portion of the guide video that the user would like to see. Further, a user may replay any portion, step, or segment, of the guide video that the user would like to view again. In addition, the guide video may be dynamically generated with different steps or portions according to the user's needs; in other words, the user may specify that only certain steps or portions of the guide materials be presented in a guide video, and those steps or portions may be combined to form different videos to fit different scenarios.

An exemplary system for providing guide materials may include a display apparatus, an input apparatus, and a computing apparatus operatively coupled to the display apparatus and the input apparatus. The display apparatus may include a graphical user interface configured to depict a guide generation region for use in generating guide materials related to at least one of doors and windows. The input apparatus may be configured to allow a user to use the guide generation region of the graphical user interface to enter user input information from which to generate the customized guide materials. The computing apparatus may be configured to display a plurality of options related to at least one of doors and windows in the guide generation region, allow a user to use the input apparatus to enter the user input information (e.g., to select one or more of the plurality of options), and generate customized guide material based on the user input information (e.g., based on the selected one or more options).

An exemplary method for providing customized guide materials may include providing a graphical user interface configured to depict a guide generation region for use in generating guide materials related to at least one of doors and windows and displaying a plurality of options related to at least one of doors and windows in the guide generation region. The exemplary method may further include allowing a user to select one or more of the plurality of options and generating customized guide material based on the selected one or more options.

A plurality of guide modules related to at least one of doors and windows and the one or more options may be provided, and generating customized guide materials based on the selected one or more options may include selecting one or more guide modules of the plurality guide modules based on the one or more user selected options and combining the selected one or more guide modules to provide the customized guide materials.

In one or more examples, the guide materials may include documentation guides (e.g., text and/or image content), audio guides (e.g., audio-only content) and/or video guides (e.g., video-only and/or video and accompanying audio content), and/or combinations thereof. In one or more examples, the plurality of options may include at least one category, and the at least one category may include one or more of care and maintenance, installation, rough opening preparation, service and warranty, removal, accessories, hardware options, and joining (which may be referred to as "mulling"). Further, each of the at least one guide categories may include a plurality of options, and the plurality of options for the care and maintenance category may include one or more of product family, product series, and product type. Still further, each of the at least one category may include a plurality of options, and the plurality of options for the installation category may include one or more of framing material, product family, wall type, and product type. Still further, each of the at least one category may include a plurality of options, and the plurality of options for the rough opening preparation category may include one or more of wall type, opening shape, flashing method, and weather resistant barrier. Still further, each of the at least one category may include a plurality of options, and the plurality of options for the service and warranty category may include one or more of product series, product family, and product type. Yet still further, the plurality of options may include a language.

In one or more examples, generating guide material based on the selected one or more options may include generating textual instructions in the selected language for the guide materials using a text-to-text translation generator and/or auditory instructions in the selected language for the guide materials using a text-to-audio translation generator.

In one or more examples, the display apparatus may be located remotely from the computing apparatus.

Exemplary systems and methods providing graphical user interfaces for use in generating customized guide materials for doors and windows shall be described with reference to the Figures. It will be apparent to one skilled in the art that elements or processes from one example may be used in combination with elements or processes of the other examples, and that the possible examples of such systems and methods using combinations of features set forth herein is not limited to the specific examples shown in the Figures and/or described herein. Further, it will be recognized that the examples described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

The exemplary systems, methods, and/or interfaces may be generally described as providing customized guide materials for one or more products. For purposes of the present disclosure, the example products are doors and windows. However, it shall be understood that the customized guide generation systems and methods described herein may be used with any type of product for which customized guides, instructions, or other informational/collateral materials may be desirable, and that the disclosure is not limited in this respect.

For example, the customized guide material generation systems and methods described herein may present a graphical user interface through which a user may input information regarding a product (such as doors and/or windows or any other product) and may generate customized guide materials based on the user input information. For example, the customized guide materials may relate, or correspond, to the preparation for installation of the doors or windows, the installation of the doors or windows, the maintenance of the doors or windows, the service and warranty of the doors or windows, joining or mulling of windows, accessories related to windows and doors, weather stripping, replacement of doors and windows, one or more parts and accessories for the doors and windows, etc.

It is to be understood that although the exemplary methods, systems, and interfaces are described as providing customized guide materials for doors and windows, the exemplary methods, systems, and interfaces may also be used with any product for which a user may need guide materials. For example, although the exemplary methods, systems, and interfaces are described as providing customized guide materials for doors and windows, the techniques described herein may be used to generate installation guides or instruction manuals for any product for which a customized instruction or installation guides or manuals may be desirable, and the disclosure is not limited in this respect.

FIG. 1 is a block diagram of an exemplary system including an input apparatus and a display apparatus that may utilize user interfaces and methods described herein for generation of guide materials. In at least one example, system 10 may be a server, a personal computer, a laptop computer, a smart phone, or a tablet computer. As shown, the exemplary system 10 includes a computing or processing apparatus 12. The computing apparatus 12 may be configured to receive user input information from input apparatus 20 and transmit output to an output apparatus 22. Further, the computing apparatus 12 may include data storage 14. Data storage 14 may store and allow computing apparatus 12 access to processing programs or routines 16 (e.g., for determining guide material information, for displaying the graphical user interface, translation routines, etc.) and one or more other types of data 18 that may be employed to carry out exemplary methods and/or processes for use in facilitating customized guide material generation for doors and windows (e.g., guide material, rules, guide material modules, guide material information, installation graphics, installation alphanumeric text, language databases, video segments, window specifications, door specifications, installation material information, service and warranty information, etc.). For example, the computing apparatus 12 may be configured to display graphical user interfaces on output apparatus 22 to allow users to use the guide material generation processes as described herein.

The computing apparatus 12 may be operatively coupled to an input apparatus 20 and to an output apparatus 22 to, e.g., transmit data to and from each of the input apparatus 20 and output apparatus 22. For example, the computing apparatus 12 may be electrically coupled to each of the input apparatus 20 and the output apparatus 22 using, e.g., analog electrical connections, digital electrical connections, wireless connections, bus-based connections, network-based connections, internet-based connections, etc. As described further herein, a user may provide input to the input apparatus 20 to manipulate, or modify, one or more graphical depictions displayed on the output apparatus 22 to view and/or adjust one or more options presented by, or proximate, the graphical depictions on the output apparatus 22 to generate, or provide, guide materials according, or related, to the user's input.

Further, various devices and apparatus may be operatively coupled to the computing apparatus 12 to be used with the computing apparatus 12 to facilitate the customized guide material generation as well as any other functionality, methods, processes, and/or logic described herein. As described, the system 10 may include input apparatus 20 and output apparatus 22 operatively coupled to the computing apparatus 12 (e.g., such that the computing apparatus 12 may be configured to use information, or data, from the apparatus 20, 22 and provide information, or data, to the apparatus 20, 22).

The input apparatus 20 may include any apparatus capable of receiving input from a user and providing that input to the computing apparatus 12 to perform the functionality, methods, processes, and/or logic described herein. For example, the input apparatus 20 may include one or more of a mouse, a keyboard, a trackball, a touchscreen (e.g., capacitive touchscreen, a resistive touchscreen, a multi-touch touchscreen, etc.), a camera, a scanner (e.g., bar code reader, QR code scanner, etc.), etc. The input apparatus 20 may allow a user to input, select, and view various options, information, and settings with respect to the guide material generation when used in conjunction with the output apparatus 22 that displays a graphical user interface. In some examples, input apparatus 20 and/or output apparatus 22 may include both input and output functionality (e.g., a touchscreen).

Likewise, output apparatus 22 may include a display or other apparatus capable of displaying information to a user, such as a graphical user interface, etc., to perform the functionality, methods, processes, and/or logic described herein. For example, the output apparatus 22 may include a liquid crystal display, an organic light-emitting diode screen, a touchscreen, a cathode ray tube display, etc. As described further herein, the output apparatus 22 may be configured to display a graphical user interface that includes one or more various user interfaces configured to receive input from a user regarding guide materials for one or more window and/or door options and to display customized guide material generated based on the user input information. For example, the graphical user interfaces displayed by the output apparatus 22 may include, or display, one or more regions of a graphical user interface configured to receive input information from a user concerning one or more doors or windows for use in generating the customized guide material. In addition to a display, output apparatus 22 may further include one or more of a printer, a speaker, or any other output device used to convey text, graphics, audio or video or otherwise output customized guide materials generated by system 10 based on the user input information.

As used herein, a "region" of a graphical user interface may be defined as a portion of the graphical user interface within which information may be displayed or functionality may be performed. Regions may exist within other regions, which may be displayed separately or simultaneously. For example, smaller regions may be located within larger regions, regions may be located side-by-side, etc. Additionally, as used herein, an "area" of a graphical user interface may be defined as a portion of the graphical user interface (GUI) located with a region that is smaller than the region it is located within.

The processing programs or routines 16 may include programs or routines that, when executed by processor 12, permit system 10 to generate and display a user-interface configured to receive input from a user concerning customized guide materials for one or more doors or windows, generate customized guide materials based on the user input, and present the guide materials on one or more output devices. To that end, the processing routines 16 may permit alphanumeric and graphical electronic document creation, video creation, rule-based guide material generation, logic, database management, user management, access control, computational mathematics, comparison algorithms, or any other processing required to implement one or more exemplary methods and/or processes described herein. Data 18 may include, for example, alphanumeric guide text in multiple languages, graphical representations of windows, doors, walls, etc., graphical representations of actions to be performed related to windows, doors, walls, etc., video modules, guide material generation rules, window specifications, door specifications, installation material specifications, look-up tables, interface graphics (e.g., graphical elements, icons, buttons, windows, dialogs, pull-down menus, graphic areas, graphic regions, 3D graphics, etc.), graphical user interfaces, results from one or more processing programs or routines employed according to the disclosure herein, or any other data that may be necessary for carrying out the one and/or more processes or methods described herein. The data 18 may be further generally described as including guide modules, or portions, which may be used to generate guide materials. One or more of the guide modules, or portions, may be combined by the computing apparatus 12, e.g., in accordance with input from users and the rules which apply to the input, to generate the customized guide materials.

In one or more examples, the system 10 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or methods as described herein or as would be applied in a known fashion.

The one or more programs used to implement the methods and/or processes described herein may be provided using any programmable language, e.g., a high level procedural and/or object orientated programming language that is suitable for communicating with a computer system. Any such programs may, for example, be stored on any suitable device, e.g., a storage media, that is readable by a general or special purpose program running on a computer system (e.g., including processing apparatus) for configuring and operating the computer system when the suitable device is read for performing the procedures described herein. In other words, at least in one example, the system 10 may be implemented using a computer readable storage medium, configured with a computer program, where the storage medium so configured causes the computer to operate in a specific and predefined manner to perform functions described herein. Further, in at least one example, the system 10 may be described as being implemented by logic (e.g., object code) encoded in one or more non-transitory media that includes code for execution and, when executed by a processor, is operable to perform operations such as the methods, processes, and/or functionality described herein.

In some examples, the system 10 may include one or more processors or computing devices configured at a remote site (e.g., an application server) that allows access by one or more users via one or more remote user computing devices (e.g., via a web browser), and allows a user to employ the functionality according to the present disclosure (e.g., the user may enter user input data concerning guide materials for window or door options via a graphical user interface associated with one or more programs configured to generate customized guide materials based on the user input, and receive customized guide materials based on the user input). For example, a system 15 including a server system 30 configured to communicate with a plurality of user computing systems 40 via a network 35 is depicted in and described further herein with respect to FIG. 2.

The computing apparatus 12 may be, for example, any fixed or mobile computer system (e.g., a controller, a microcontroller, a personal computer, minicomputer, tablet computer, laptop, smart phone, or other mobile device). The exact configuration of the computing apparatus 12 is not limiting, and any device capable of providing suitable computing capabilities and control capabilities (e.g., alphanumeric and graphical electronic document creation/processing, video creation processing, rule-based logic processing, graphics processing, etc.) may be used. In other words, the physical configuration, size, and other hardware features of the computing apparatus 12 (e.g., devices and systems) supporting the exemplary generation of guide material are not particularly limited, and may include desktop apparatus, laptop apparatus, handheld mobile digital electronic devices, tablet computers and smart phones, as well as other known devices. In like manner, communication protocols and transmission methods are not particularly limited, and may include wireless as well as wired communication apparatus.

As described herein, data 18 may include any electronic storage medium (e.g., volatile or nonvolatile memory, a CD-ROM, a punch card, magnetic recordable tape, etc.) containing digital bits (e.g., encoded in binary, trinary, etc.) that may be readable and/or writeable by computing apparatus 12 described herein. Also, as described herein, a file in user-readable format may be any representation of data (e.g., ASCII text, binary numbers, hexadecimal numbers, decimal numbers, graphically, etc.) presentable on any medium (e.g., paper, a display, etc.) readable and/or understandable by a user.

In view of the above, it will be readily apparent that the functionality as described in one or more examples according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

One will recognize that graphical user interfaces may be used in conjunction with the examples described herein. The graphical user interfaces may provide various features allowing for user input thereto, change of input, importation or exportation of files, viewing or display of customized guide materials, or any other features that may be generally suitable for use with the processes described herein.

The methods and/or logic described in this disclosure, including those attributed to the systems, or various constituent components, may be implemented, at least in part, in hardware, software, firmware, or any combination thereof. For example, various aspects of the techniques may be implemented using computing apparatus including one or more processors, which may include one or more microprocessors, DSPs, ASICs, FPGAs, or any other equivalent integrated or discrete logic circuitry, as well as any combinations of such components, or other devices. The terms "computing apparatus," "processor," and "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

Figure 2:
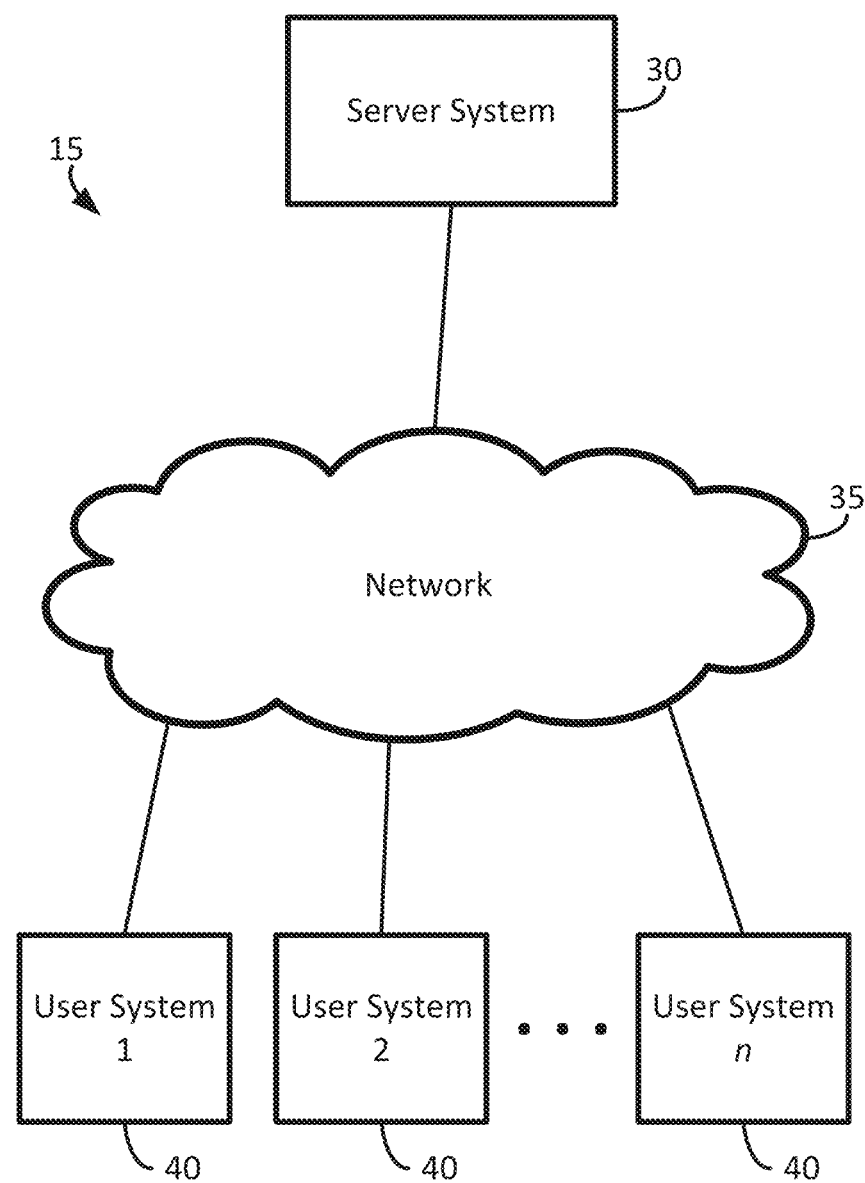
FIG. 2 is a block diagram of an exemplary system including a server system, network, and plurality of user systems that may utilize the user interfaces and/or methods described herein for generation of guide materials.

The exemplary system 10 may be representative of one or more server systems and user systems. For example, a system 15 including a server system 30 connected to a plurality of user systems 40 via a network 35 is depicted in FIG. 2. Each of the server system 30 and user systems 40 may be similar to the exemplary system 10 and may include some and/or all of the processing routines and/or data described herein configured for use in facilitating guide material generation for doors and windows. For example, a user may use a user system 40 to access guide material generation processing routines and data on the server 30. Further, more than one user system 40 may be used to access guide material generation processing routines and data on the server 30 simultaneously.

As shown, each of the user systems 40 and the server system 30 are connected to each other through a network 35. The network 35 may be the internet, one or more local area networks, and/or any other type of network used to couple computer systems. Although only a single server system 30 is depicted, the system 15 may include more than one server system 30. Additionally, a single server system 30 may include a plurality of computing devices, or computer systems, configured to interoperate, or operate together, to provide the guide material generation for the user systems 40. For example, the server 30 may operate with a translation service (e.g., which may be on the server 30 or another server) as will be described further herein with respect to FIG. 17.

It is to be understood that the depicted topology and configuration of the exemplary system 15 is not meant to restrict and/or limit the exemplary systems, methods, and/or interfaces described herein. In other words, it is to be understood that the exemplary system 15 is merely one example, and that multiple different topologies and configurations may be used to provide the guide material generation described herein.

Figure 3:
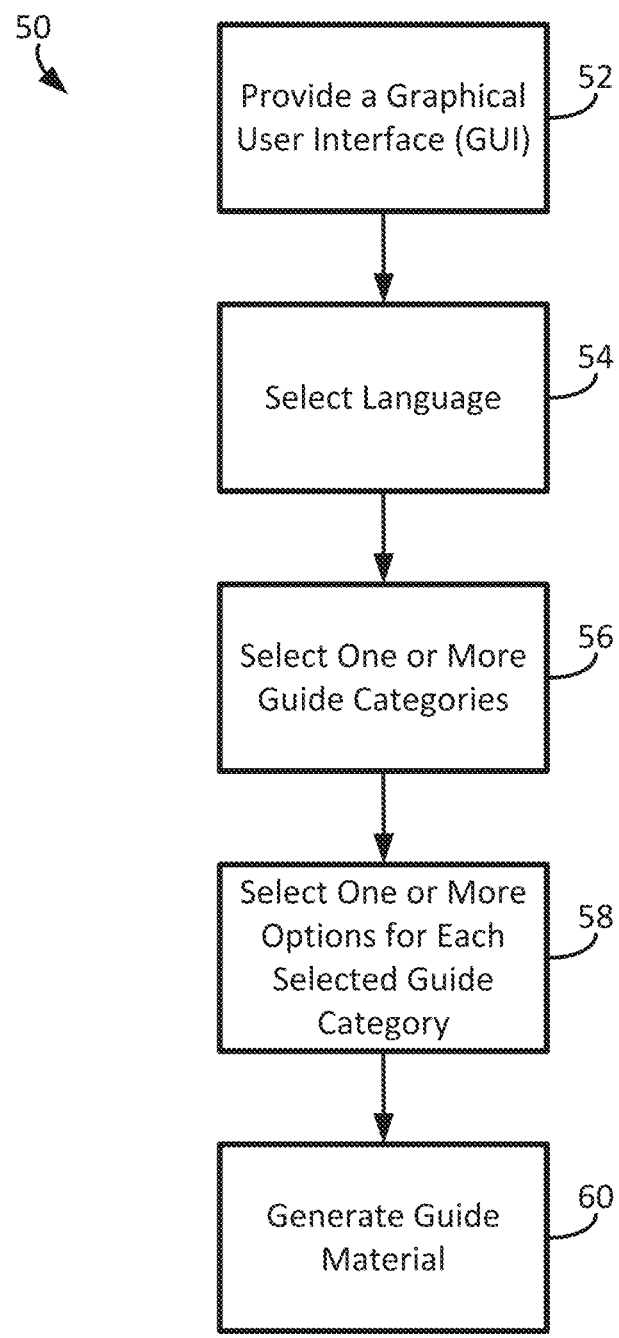
FIG. 3 is a flow diagram illustrating an exemplary method for providing customized guide materials.

FIG. 3 is a flowchart illustrating an exemplary method (50) by which a computing device(s) may provide customized guide materials for one or more doors and windows or other products. The exemplary method (50) may include providing a graphical user interface configured to receive user input information concerning guide materials for one or more doors or windows (52). For example, the graphical user interface may be presented on a user computing device. A user may, through the graphical user interface, input the user input information (such as door and/or window information). For example, the user may, through the graphical user interface, select a language (54), select one or more guide categories (56), and select one or more options for each selected guide category (58). The computing device(s) may receive the user input information and generate customized guide materials based on the user input information 60. The computing device(s) may further provide the customized guide materials generated based on the user input information 60. For example, the computing device(s) may present the customized guide materials on the graphical user interface, or permit a user to download or print the customized guide materials. In other words, the computing device(s) may generate and display a graphical user interface that allows a user to input information related to one or more doors and/or windows, generate customized guide materials based on the user input information, and present (e.g., for display, printing, video playback, etc.) the customized guide materials generated based on the user input information.

The user input information related to doors and/or windows may include, for example, identification of the doors and/or windows, characteristics of the doors and/or windows, and/or anything related to the doors and/or windows. The user input information may further include a selected language, one or more guide categories, and one or more options for each of the selected guide categories as described further herein below.

Exemplary graphical user interfaces, and portions, regions, areas, etc. thereof, that may be provided by the method 50 of FIG. 3 and systems 10, 15 of FIGS. 1-2 are depicted in FIGS. 4-9, 11, and 14. Such exemplary graphical user interfaces may be depicted by the output apparatus 22 of the system 10 described herein with reference to FIG. 1. Additionally, since server system 30 and the plurality of user systems 40 of FIG. 2 may be implemented by a system, such as system 10 described with reference to FIG. 1, the server system 30 and the plurality of user systems 40 may include display apparatus similar to that of system 10, and thus, may be configured to depict the exemplary graphical user interfaces described herein. In at least one example, the graphical user interfaces described herein may be depicted on a touchscreen, and in such configuration, the touchscreen may function as both an input apparatus and an output apparatus.

Figure 4:
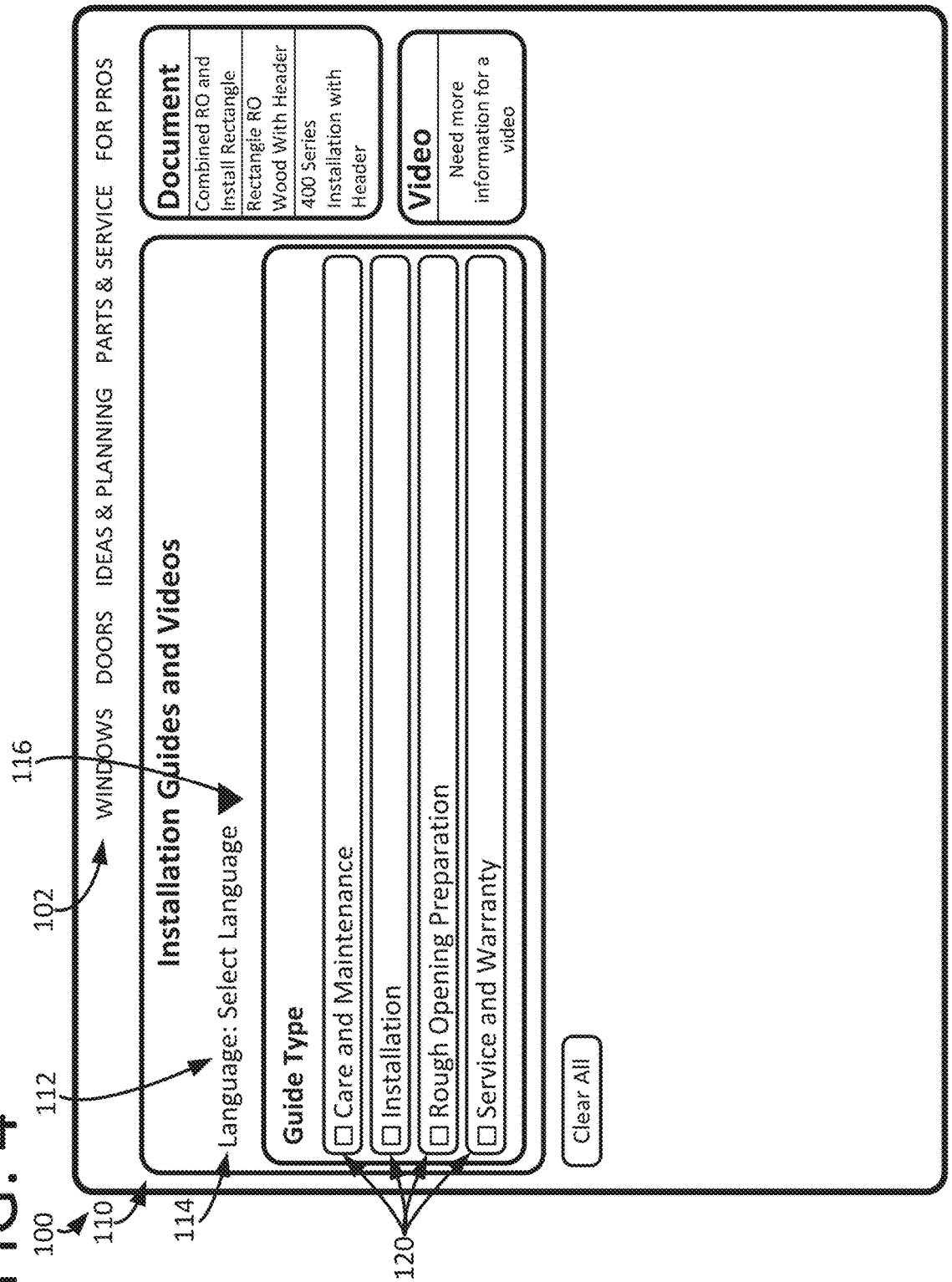
FIG. 4 is conceptual diagram illustrating an exemplary graphical user interface for providing customized guide materials including a plurality of guide category options.

As shown in FIG. 4, an exemplary graphical user interface 100 may include a guide generation region 110. The guide generation region 110 may be generally described as a portion of the graphical user interface 100 that may be used to present user selectable information and receive user input concerning guide materials for one or more doors or windows. For example, a user may use the guide generation region 110 to input one or more types, categories, preferences, options, selections, references, etc. related to at least one door or window. The guide generation region 110 may further provide the generated customized guide material. For example, the guide generation region 100 may present the customized guide materials within an interactive graphical user interface, may present the guide materials as a single document (such as a pdf document), may present links to the customized guide materials, may permit a user to download the customized guide materials, may provide for video playback of customized guide materials, etc. In other words, the guide generation region 110 may allow the selection of multiple options that affect the customized guide material to be generated and/or presented.

It is to be understood that the guide generation region 110 of the graphical user interface 100 may define the entire graphical user interface 100 or may be a portion, or subset, of the graphical user interface 100. In other words, the graphical user interface 100 may only include the guide generation region 110 or may include more regions than the guide generation region 110. For example, as shown, the graphical user interface 100 may include regions other than guide generation region 110 such as, e.g., a tool bar region 102 configured for navigation to other user interface regions or areas including various other information and/or functionality.

The graphical user interface 100 may be a web page rendered within a web browser, or other similar interpretation engine or renderer. If the graphical user interface 100 is a web page, the guide generation region 110 may be described as one web page, a plurality of web pages, a region or portion of a single web page, etc. Further, the graphical user interface 100 may be described as being a software application, or app, configured to run on a personal computer, tablet computer, smart phone, etc. In other words, the guide generation region 110 may be provided in many different forms, and the exemplary guide generation region 110 depicted in the figures is only one example.

Referring again to FIG. 3, receiving the user input information of the example method (50) may further include receiving a selected language (54) in which to generate the customized guide materials. With respect to example guide generation region 110 of FIG. 4, for example, graphical user interface 100 includes a language selection region 112 including a pull-down list 114 from which a user may select one of a plurality of languages in which to generate the customized guide materials. For example, a user may select "English" if the user desires the guide materials to be generated in the "English" language. Other languages may be provided such as, e.g., French, Spanish, Chinese, Japanese, Italian, German, Russian, etc. Generating guide materials in the selected language may include generating text and/or image-based guide materials in the selected language, generating audio and/or video-based guide materials in the selected language, and generating any other type of customized guide material in the selected language. Additionally, the selection of a language using the language selection region 112 of the guide generation region 110 may further include generating and presenting the graphical user interface 100 in the selected language.

In the example of FIG. 4, the language selection region 112 includes the text "Language: Select Language" 114 and a graphical representation, or icon, 116 of a downward facing arrow to indicate that, upon selection by a user (e.g., touching the graphical representation or text with the user's finger, clicking the graphical representation or text with a cursor, or arrow, etc.), a menu may be depicted including a plurality of different languages from which a user may select. After a language is selected, the proper name of the selected language may appear in place of the text "Select Language" 114 to indicate to a user what language has been selected. For example, as shown in FIG. 5, the language "English" has been selected, and thus, the text "English" 114 is shown in place of the text "Select Language." As a result, any customized guide material generated using the guide generation region 110 will utilize, or use, the "English" language.

Referring again to FIG. 3, receiving the user input information of the example method (50) may further include receiving a selection of one or more guide categories 120 (56) and may further include receiving one or more selected options for each selected guide category (58). For example, one or more guide categories 120 selectable by a user may be displayed on the guide generation region 110. As shown in the window/door example of FIG. 4, the one or more guide categories 120 may include "care and maintenance," "installation," "rough opening preparation," and "service and warranty." Although not shown, the one or more guide categories 120 may further include any number of other categories related to doors or windows such as "safety," "joining," "mulling," "removal," replacement," "accessories," etc. For generation of customized guide materials for products other than doors or windows, any appropriate guide categories relevant to the product may be used.

Figure 5:
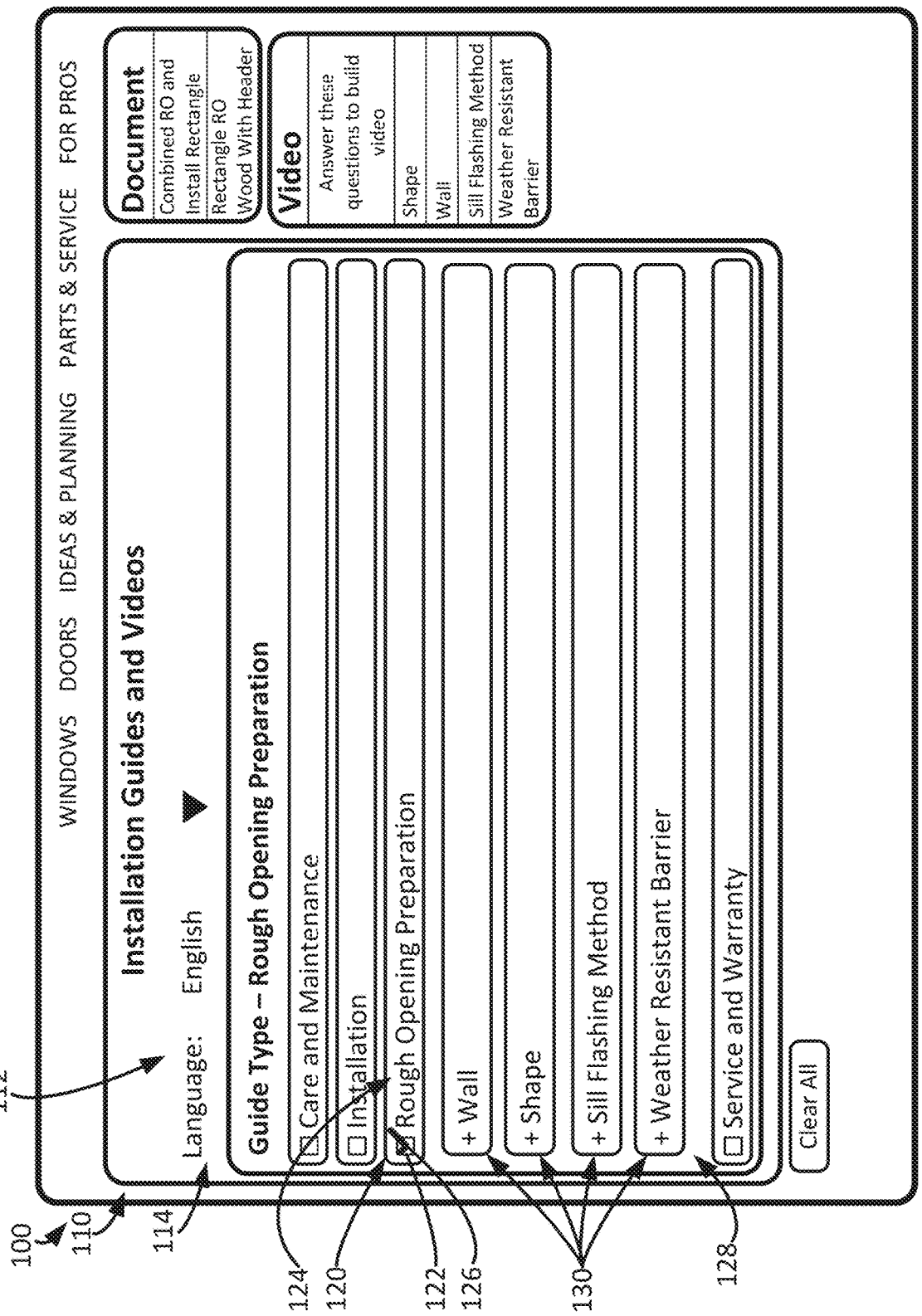
FIG. 5 is a conceptual diagram illustrating an exemplary graphical user interface for providing customized guide materials including user selections in the "rough opening" guide category.

As shown in the example of FIG. 5, each guide category 120 may include a check-box 122 proximate a title 124 of the guide category 120, and may be selected by one or both of selecting the check-box 122 and title 124 of the guide category 120. After a guide category 120 is selected, a checkmark 126 may appear in the check-box 122 of the selected guide category to indicate that the category 120 has been selected. If a user would like to un-select, or de-select, a previously-selected category, the user may select one or both of the check-box 122 and title 124 of the previously-selected category 120, and the checkmark 126 in the check-box 122 may disappear or be removed.

In FIG. 5, for example, a user has selected the guide category "rough opening preparation". The example method (50) may therefore generate customized guide materials that include only "rough opening preparation" guide material. In another example, if a user selects multiple guide categories 120, such as the guide categories "service and warranty" and "rough opening preparation", the example method (50) may generate customized guide materials including "service and warranty" and "rough opening preparation" guide material.

Referring again to FIG. 3, receiving the user input information (54) of the example method (50) may further include receiving one or more selected options associated with each of the selected guide categories. Each guide category 120 may include one or more options selectable by a user that are displayed upon selection of the associated guide category. For example, when a category 120 is selected by a user using input apparatus and the guide generation region 110, a category options area 128 may be displayed proximate the selected guide category 120 on the guide generation region 110 (see, e.g., FIG. 5).

In FIG. 5, for example, a user has selected the "Rough Opening Preparation" guide category 120. Graphical user interface 100 may therefore present a category options area 128 with respect to the selected "Rough Opening Preparation" category 120 (e.g., the selection is noted with a checkmark 126 in the check-box 122). The category options area 128 may include option areas 130 related to the selected category 120. As used herein, in some examples, the option areas 130 may also be referred to as "sub-options" because the category 120 may be referred to as an "option," and the "sub-options" are associated with the selected category 120. In some examples, the one or more options may be presented in order from the most commonly selected option to the least commonly selected option. In other examples, the options may be presented in the same fixed order to all users, regardless of how often each particular option is chosen.

Figure 11:
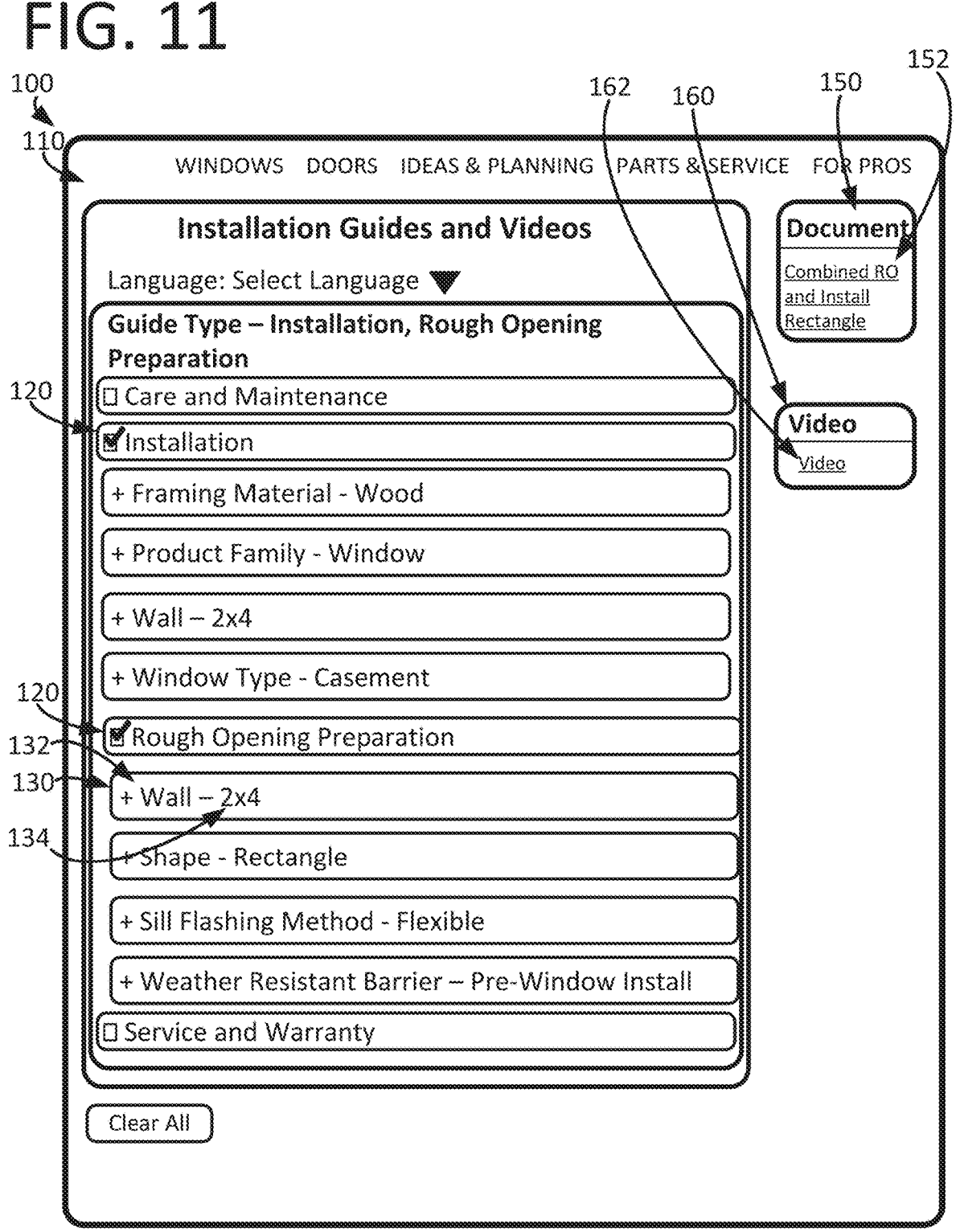
FIG. 11 is a conceptual diagram illustrating an exemplary graphical user interface for providing customized guide materials including user selections in the "installation" category and the "rough opening" category.

As shown in FIG. 5, the option areas 130 for the "Rough Opening Preparation" category 120 include a "Wall" area, a "Shape" area, a "Sill Flashing Method" area, and a "Weather Resistant Barrier" area, each of which will be described further herein with respect to FIG. 6. A user may select one or more of the option areas 130 to provide, or enter, input information for the selected option areas 130. As shown in FIG. 5, no input information has yet been provided for any of the option areas 130 of the "Rough Opening Preparation" category 120. Once input has been provided, or entered, the entry, or input, may be indicated within the option area 130. For example, the entry, or input information may be presented proximate (e.g., to the right of) to the option title 132 as shown by reference numeral 134 in FIG. 11. Specifically, as shown in FIG. 11, the option 130 entitled "Wall" 132 includes the entry "2×4" indicating that the wall type selected by the user is standard 2×4 construction.

Figure 6:
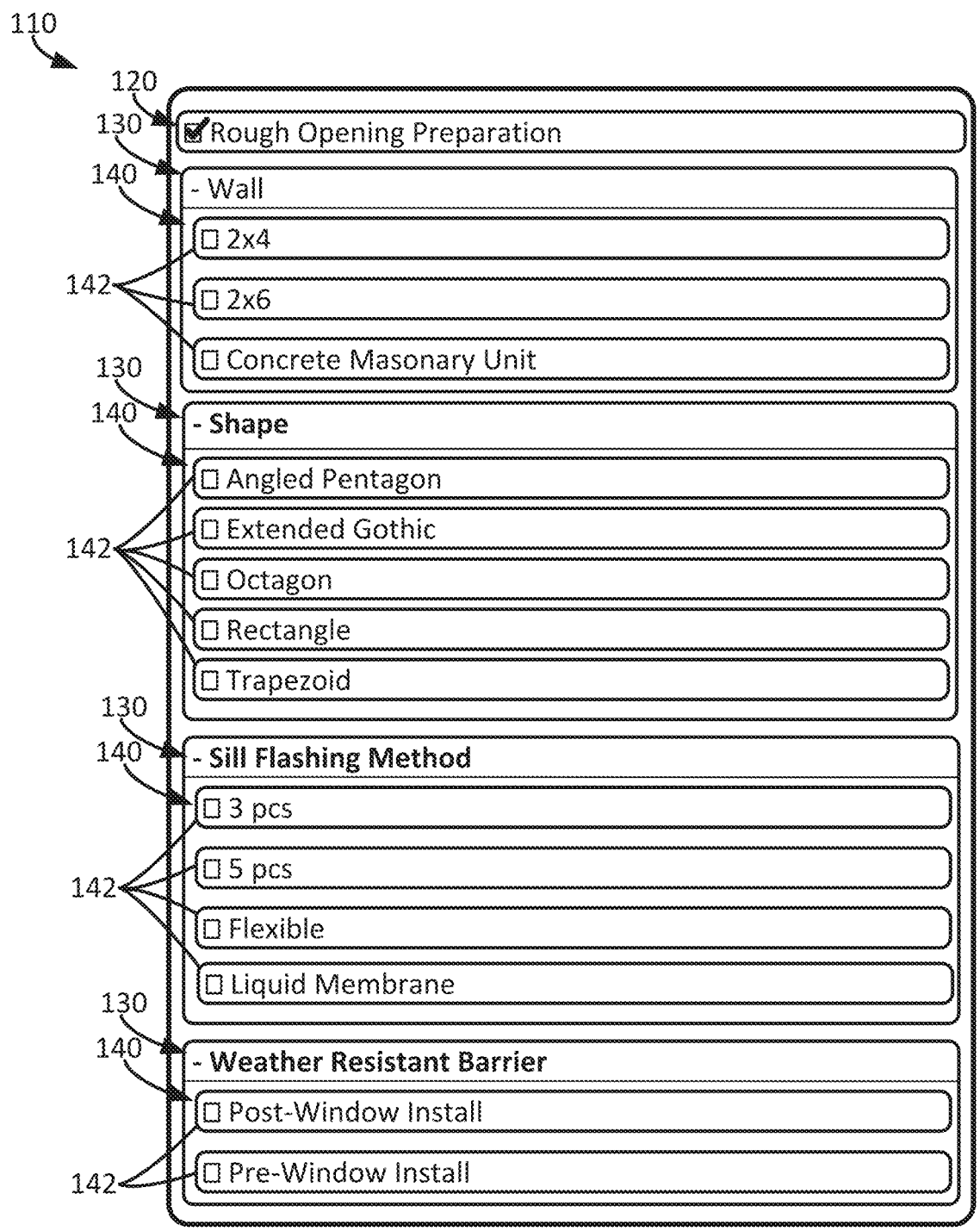
FIG. 6 is a conceptual diagram illustrating an exemplary graphical user interface for providing customized guide materials including options of the "rough opening" guide category.

To enter, or provide, input information for each option area 130, a user may select an option area 130 and an expanded option selection area 140 may then be displayed as shown in FIG. 6. The expanded option selection area 140 may include a plurality of selectable values 142 for each option 130. The selectable values 142 may operate in a similar manner to the guide categories 120 described herein. For example, each selectable value 142 may include a title and checkbox upon which a checkmark may be displayed upon selection of the selectable value 142. Further, each selectable value 142 may be selected by selecting the title and/or checkbox.

Example selectable values 142 for each of the options 130 of each of the guide categories 120 shown in FIGS. 4-5 are depicted in FIGS. 6-9. It is to be understood that the user selectable language, guide categories and options depicted in FIGS. 4-9 are only one example, and additional languages, guide categories, and/or options may be used with the exemplary systems, method, and interfaces described herein, and that the disclosure is not limited in this respect. In some examples, the one or more options may be presented in order from the most commonly selected option to the least commonly selected option. In other examples, the options may be presented in the same fixed order to all users, regardless of how often each particular option is chosen.

The "Rough Opening" guide category 120 of FIG. 6 may be used to input data regarding the rough opening to provide guide materials with respect to construction, or creation, of the rough opening. The "Wall" option 130 of FIG. 6 may be used by a user to select the type of wall construction for the rough opening. As shown in FIG. 6, upon selection of the "Wall" option 130, the example selectable values 142 depicted in the option selection area 140 are "2×4," which represents 2×4 wall construction, "2×6," which represents 2×6 wall construction, and "concrete masonry unit," which represents concrete masonry construction (e.g., brick construction, insulated concrete forms (ICF), etc.). Although not depicted, other "Wall" selectable values 142 may further be presented such as, e.g., log construction, structural insulated panels (SIPS), etc.

The "Shape" option 130 of FIG. 6 may be used by a user to select the shape of the rough opening. Upon selection of the "Shape" option 130, the example selectable values 142 depicted in the option selection area 140 are "Angled Pentagon," "Extended Gothic," "Octagon," "Rectangle," and "Trapezoid." Although not depicted, other "Shape" selectable values 142 may further be presented such as, e.g., circle, right triangle, arch-top, etc.

The "Sill Flashing Method" option 130 of FIG. 6 may be used by a user to select the type of sill flashing used, or to be used, in the rough opening. Upon selection of the "Sill Flashing Method" option 130, the example selectable values 142 depicted in the option selection area 140 are "3 pcs," which represents three-piece sill flashing, "5 pcs," which represents five-piece sill flashing, "Flexible," which represents 1 and 3 piece sill flashing, and "Liquid Membrane," which represents continuous coatings. Although not depicted, other "Sill Flashing Method" selectable values 142 may further be presented such as, e.g., 1 piece rigid pan flashing, etc.

The "Weather Resistant Barrier" option 130 of FIG. 6 may be used by a user to select the type of weather resistant barrier used, or to be used, in the rough opening. Upon selection of the "Weather Resistant Barrier" option 130, the example selectable values 142 depicted in the option selection area 140 are "Post-Window Install," which indicates that the weather resistant barrier was or will be installed after the window or door, and "Pre-Window Install," which indicates that the weather resistant barrier was or will be installed before the window or door. Although not depicted, other "Weather Resistant Barrier" selectable values 142 may further be presented such as, e.g., tar paper, spun woven polymers, polymer films, etc.

Figure 7:
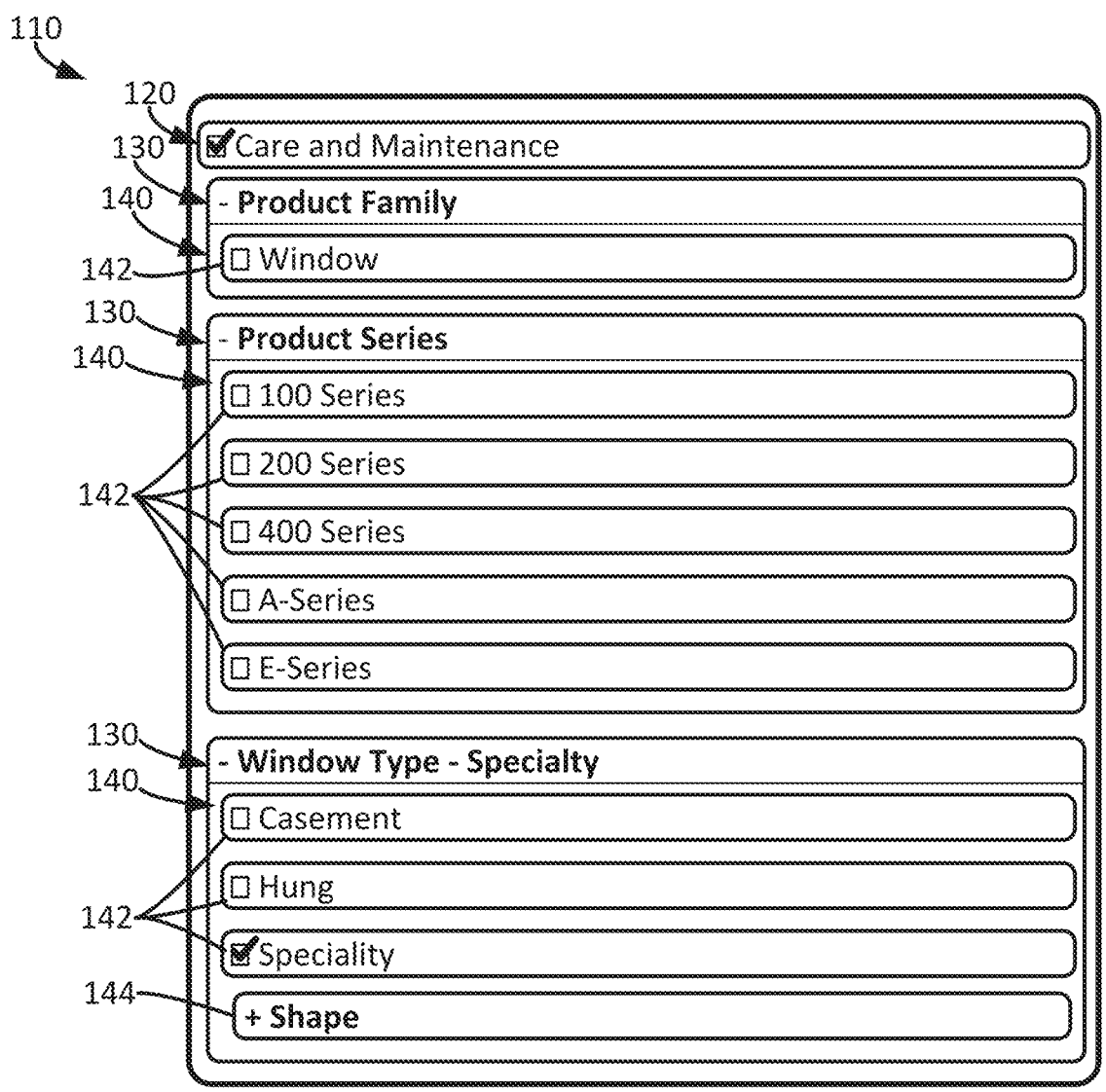
FIG. 7 is a conceptual diagram illustrating an exemplary graphical user interface for providing customized guide materials including options of a "care and maintenance" guide category.

The "Care and Maintenance" guide category 120 of FIG. 7 may be used to input data regarding the window or door to provide care and maintenance materials with respect to the window or door. The "Product Family" option 130 of FIG. 7 may be used by a user to select family of the product to be installed. As shown in FIG. 7, upon selection of the "Product Family" option 130, the example selectable value 142 depicted in the option selection area 140 is "Window." Although not depicted, other "Product Family" selectable values 142 may further be presented such as, e.g., "Door," "Storm Door," "accessories," joining," etc.

The "Product Series" option 130 of FIG. 7 may be used by a user to select series of the product to be installed. As shown in FIG. 7, upon selection of the "Product Series" option 130, the example selectable values 142 depicted in the option selection area 140 are "100 Series," "200 Series," "400 Series," "A-Series," and "E-Series." It is to be understood that the selectable values 142 depicted in the option selection area 140 are only one example and that additional selectable values 142 under the "Product Series" option 130 may be provided using the exemplary systems and methods described herein.

Additionally, the "Product Series" option 130 may be dependent on the "Product Family" selectable value 142 that is selected by a user. For example, different "Product Family" selectable values 142 in the "Product Family" option 130 may provide different "Product Series" selectable values 142 in the "Product Series" option 130. For example, a "Window" selectable value 142 for the "Product Family" option 130 may provide "Product Series" selectable values 142 related to the windows while a "Door" selectable value 142 for the "Product Family" option 130 may provide "Product Series" selectable values 142 related to the doors. In other words, the "Product Series" option 130 may be dependent on the "Product Family" option 130. Other options 130, and in turn, selectable values 142, may be dependent on each other, or relate to each other as will be described further herein.

The "Window Type—Specialty" option 130 of FIG. 7 may be used by a user to select the type of window to be installed and/or the specialty (e.g., special shape, etc.). As shown in FIG. 7, upon selection of the "Window Type—Specialty" option 130, the example selectable values 142 depicted in the option selection area 140 are "Casement," "Hung," and "Specialty." Although not depicted, other "Window Type—Specialty" selectable values 142 may further be presented such as, e.g., circle, right triangle, arch-top, etc. A user may select the "Specialty" selectable value 142 of the "Window Type—Specialty" option 130 of FIG. 7 to be presented with still further options, which will be described with respect to and shown in the "Installation" guide category 120 depicted in FIG. 8.

Figure 8:
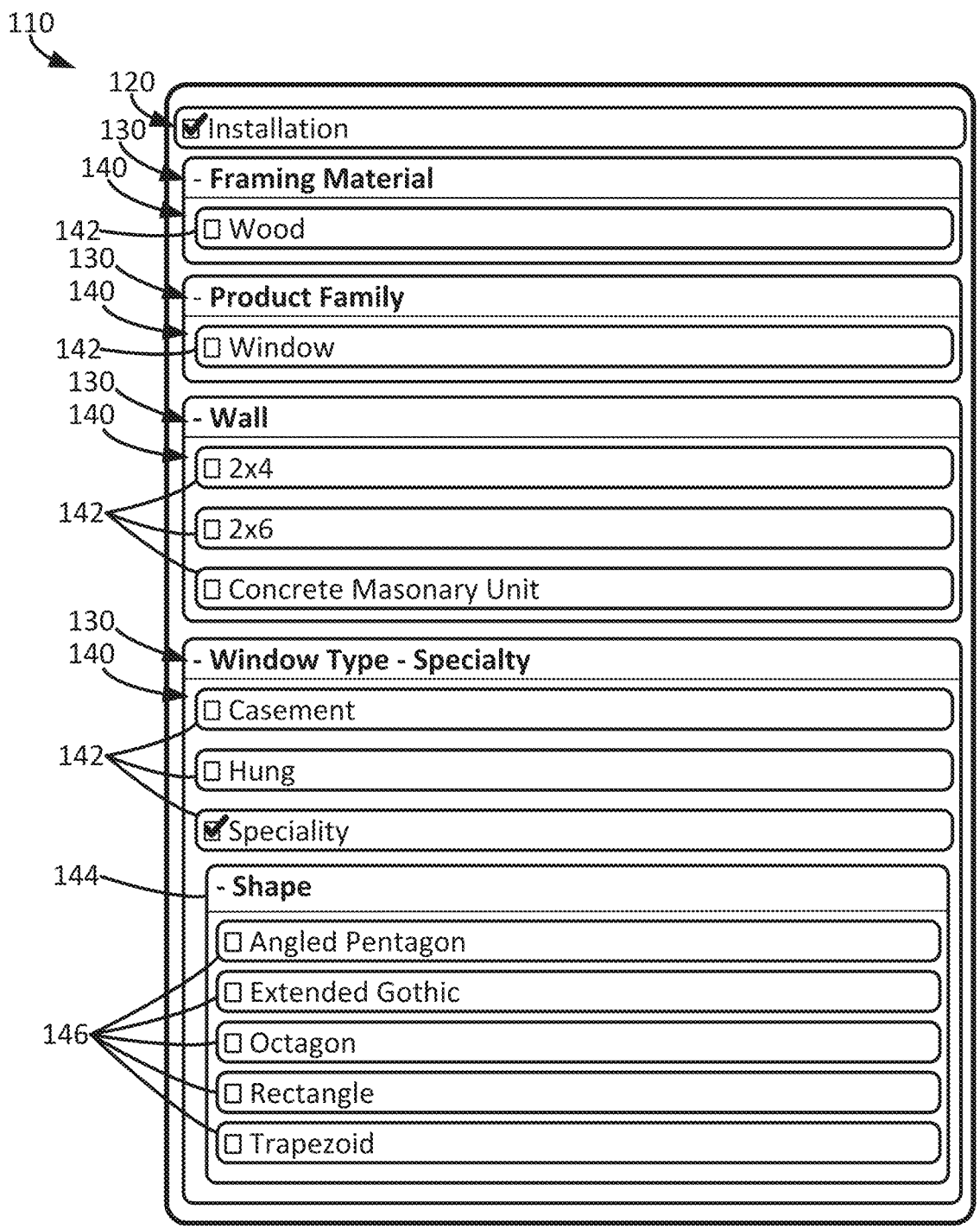
FIG. 8 is a conceptual diagram illustrating an exemplary graphical user interface for providing customized guide materials including options of an "installation" guide category.

The "Installation" guide category 120 of FIG. 8 may be used to input data regarding the window or door and wall that the window or door is to be installed within to provide installation guide materials. The "Framing Material" option 130 of FIG. 7 may be used by a user to select the type of framing material of the structure that the product to be installed within. As shown in FIG. 8, upon selection of the "Framing Material" option 130, the example selectable value 142 depicted in the option selection area 140 is "Wood." Although not depicted, other "Framing Material" selectable values 142 may further be presented such as, e.g., "Metal," "cement masonry unit (CMU), insulated concrete forms (ICF), log walls, etc.

The "Product Family" option 130 of FIG. 8 may be used by a user to select the family of the product to be installed that is similar to and described further herein with respect to the "Product Family" option 130 of FIG. 7. Further, the "Wall" option 130 of FIG. 8 may be used by a user to select the type of wall construction for the installation of the window or door that is similar to and described further herein with respect to the "Wall" option 130 of FIG. 6. Still further, the "Window Type—Specialty" option 130 of FIG. 8 may be used by a user to select the type of window to be installed and/or the specialty (e.g., special shape, etc.) that is similar to and described further herein with respect to the "Window Type—Specialty" option 130 of FIG. 7.

As shown in FIG. 8, upon the selection of the "Specialty" selectable value 142 of the "Window Type—Specialty" option 130 of FIG. 7, a "Shape" option 144 may be presented with a plurality of selectable values 146. The example plurality of selectable values 146 include "Angled Pentagon," "Extended Gothic," "Octagon," "Rectangle," and "Trapezoid." Although not depicted, other "Shape" selectable values 146 may further be presented such as, e.g., circle, right triangle, arch-top, etc.

Figure 9:
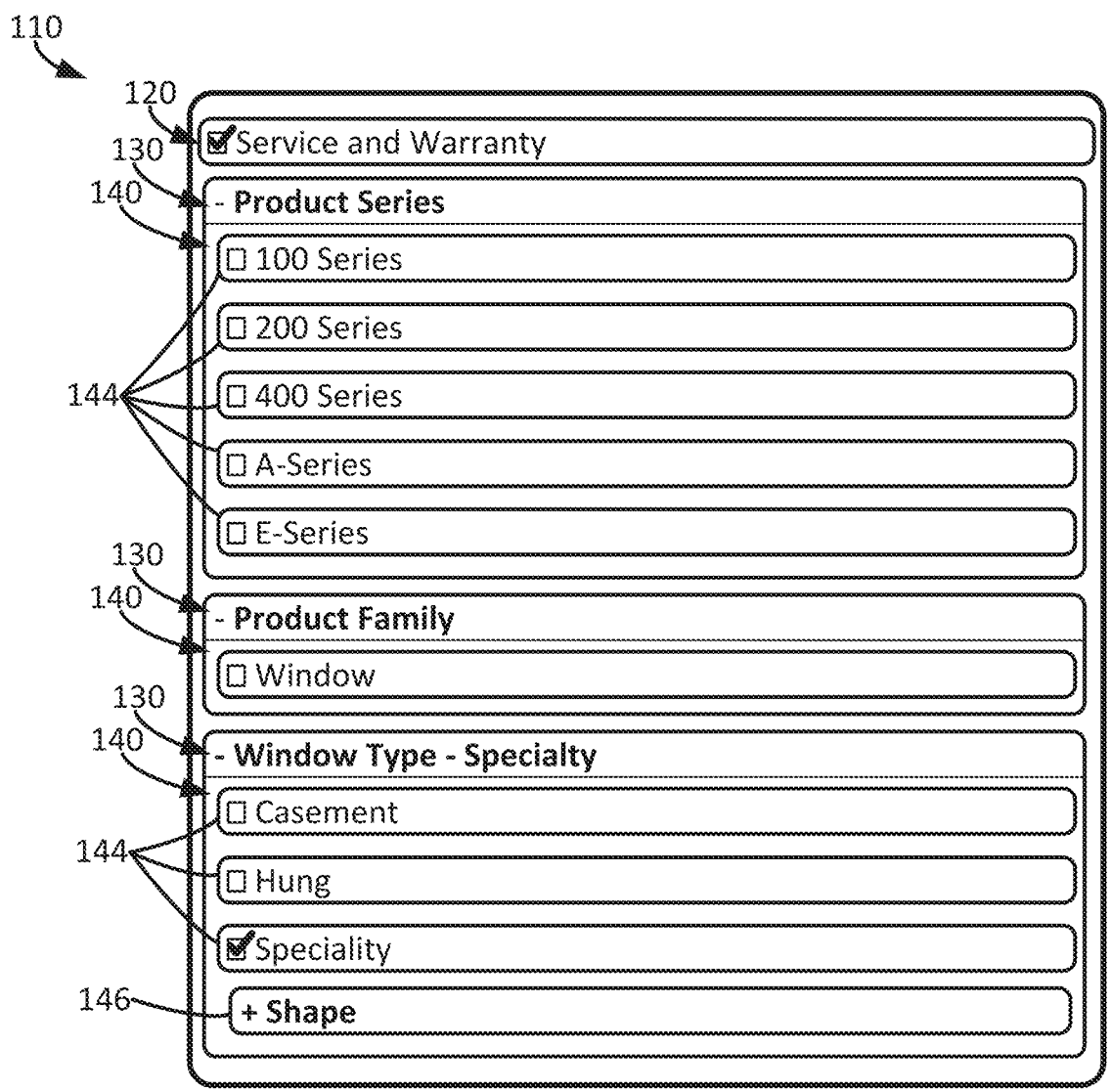
FIG. 9 is a conceptual diagram illustrating an exemplary graphical user interface for providing customized guide materials including options of a "service and warranty" guide category.

The "Service and Warranty" guide category 120 of FIG. 9 may be used to input data regarding the window or door that is or is to be installed to provide service and warranty guide materials. The "Service and Warranty" guide category 120 of FIG. 9 includes the example options 130 "Product Series," "Product Family," Window Type—Specialty" that are similar to and described further herein with respect to the options 130 of FIGS. 6-8.

Referring again to FIG. 3, upon receipt of the user input information (e.g., selection of the language (54), the guide categories (56), and/or the one or more options for each of the selected guide categories (58)), a computing device executing the exemplary method (50) may generate customized guide materials based on the user input information (60). Generating the customized guide materials based on the user input information (60) may include generating guide materials based on the selected language, the selected guide categories, and the selected options. As described herein, the customized guide materials generated may include electronic documents, audio, and/or video.

In some examples, the computing device may build the customized guide materials upon receipt of the user input information. The computing device may build the customized guide materials into a single document (e.g., a single pdf document) including text and/or images that may be viewed or presented on a display, downloaded, printed, or otherwise output to a user computing device. The customized guide materials may further include a guide video, including audio and/or video, which may be played back or downloaded on a user computing device.

Figure 10:
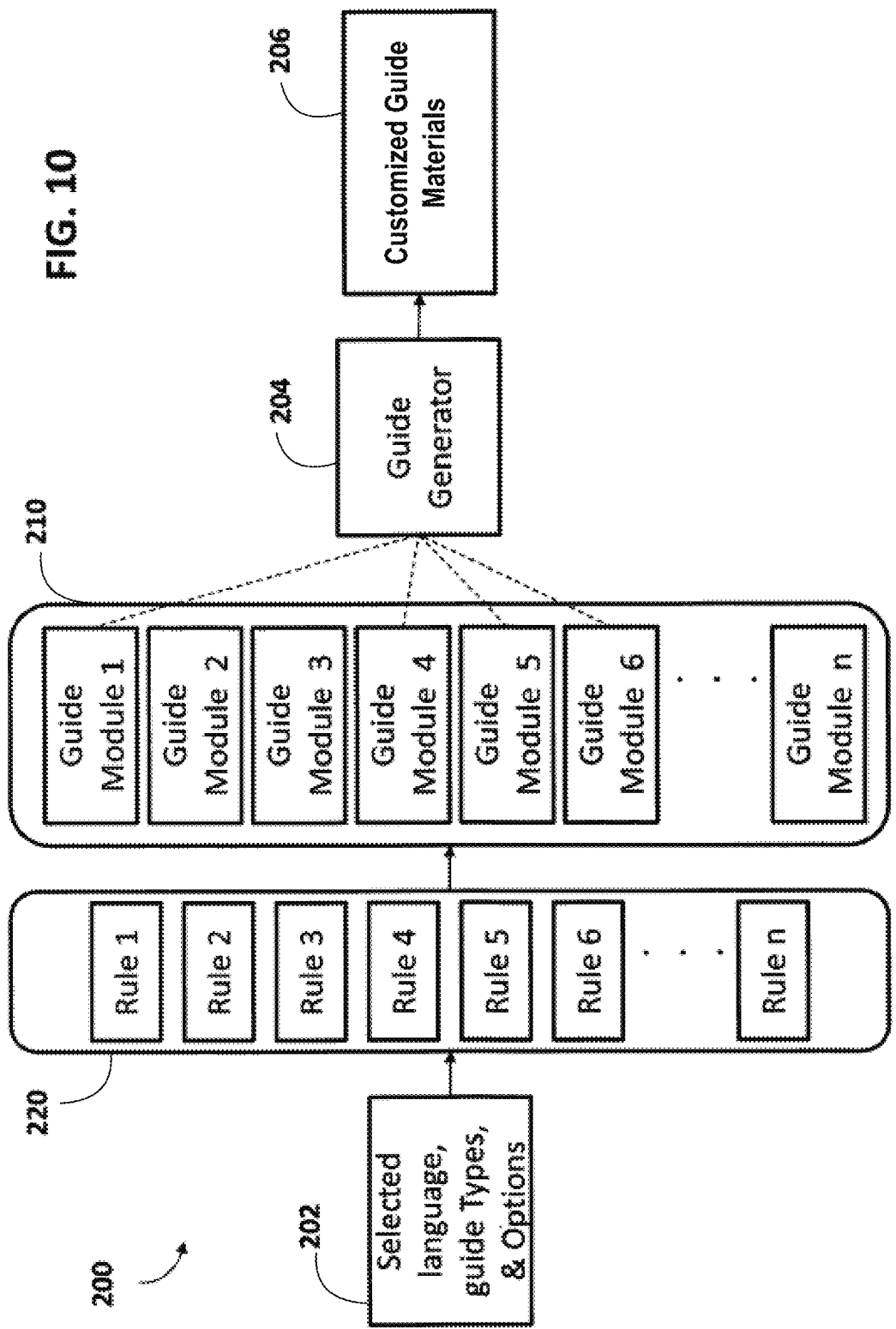
FIG. 10 is a block diagram illustrating a diagrammatic representation of an exemplary system for generating customized guide materials.

FIG. 10 is a block diagram illustrating a diagrammatic representation of an exemplary system for generating customized guide materials, such as customized guide materials 206. In this example, computing system 200 includes a rule-based relational database system that relates user input information 202 (e.g., user selected language, guide categories, and the options for each of the selected guide categories) to a plurality of guide modules 210 using a plurality of rules 220. To that end, the system 200 may include a guide generator 204, a plurality of guide modules 210, and a plurality of rules 220.

The number of possible user selected options, including language, one or more guide material categories, and one or more options for each of the guide material categories, means that there are a large number of possible combinations of options for the user input information that may be selected by the user. Each possible combination of options is related by one of rules 220 to a pre-defined set of guide modules from among the plurality of guide modules 210 that are relevant to that specific combination of options chosen by the user.

In some examples, each rule may correspond with more than one of the possible combinations of options. For example, the guide modules corresponding to the user selectable option "100 Series" in FIG. 7 may be identical to the guide modules that correspond to the user selectable option "200 Series." In that example, the combination of options including the "100 Series" option and the combination of options including the "200 Series" option may correspond to the same rule in the plurality of rules 220 (assuming the other relevant user selectable options are the same). In another example, certain number of the guide modules that apply to one user selectable option may also apply to other user selectable options. For example, the "Rough Opening Preparation" guide modules for the user selectable options "Angled Pentagon," "Extended Gothic," "Octagon," "Rectangle," and "Trapezoid" in FIG. 8 may be identical (assuming all other relevant user selectable options effecting the rough opening preparation are the same) in the example where the method of preparing the rough opening is the same regardless of the window shape. In that example, the combinations of options including each of the specified shapes may correspond to the same rule in the plurality of rules 220.

In this way, the total number of rules 220 may be reduced as compared to a system in which there is a one-to-one correspondence between the number of possible combinations of options and the number of rules. In addition, the total number of guide modules 210 may also be reduced as at least some of the plurality of guide modules may apply to more than one user selectable option. In other words, because at least some of the guide modules 210 may be used to create customized guide modules for more than one combination of options (each guide module may be re-used for any number of rules), the total number of guide modules 210 may be reduced. This system thus may help to provide flexibility in that each individual rule guide module may be revised or updated without affecting any of the other rules or guide modules. In addition, the system may help reduce data storage requirements as significantly less storage space is needed as compared to systems in which there is a one-to-one correspondence between the number of possible combinations of options and the number of rules, and/or to systems in which a complete set of unique guide materials must be stored for each possible combination of user selectable options.

Guide generator 204 may include one or more computing devices that receive the user input information 202 (e.g., the user selected language, guide categories, options for each of the selected guide categories). Guide generator 204 may further identify which of rules 220 corresponds to the user input information. The combination of options specified by the user input information determines which rule of the plurality of rules 220 should be applied. Guide generator 204 may further apply the identified rule to determine an associated pre-defined set of guide modules from among the plurality of guide modules 210 that are relevant to the specific combination of options chosen by the user as specified by the user input information. The guide generator 204 may further build the customized guide materials 206 using the pre-defined set of guide modules associated with the identified rule.

The rules 220 may be described as a function of one or more selected options 202 to provide, or create, customized guide material from the plurality of guide modules 210. Each rule 220 may be described as creating, or providing, one variant, or variation, of customized guide materials 206 that is different than any other guide material 206 created, or provided, by any of the other rules 220. In some examples, each rule in the plurality of rules 220 may apply to each different combination of user input information provided by the one or more selected options 202 (e.g., user selected language, guide categories, options, etc.). In other examples, each rule 220 may apply to certain guide modules 210 and/or certain options 202 that work together to create, or provide, guide material customized guide materials 206.

For example, the input to the rules 220 may be the answers (the user input information 202, e.g., the user selected language, guide categories, options, etc.) to a dynamic list of questions (e.g., the user selectable language, guide categories, and options presented on the graphical user interface). From those answers, a variable number of guide modules 210 may be returned with specific information that relates only to those answers.

For example, the guide generator 204 may receive the user input information 202 (e.g., the user selected language, guide categories, options, etc.) input by a user using the exemplary graphical user interfaces described herein with respect to FIGS. 4-9, identify and apply the rule from the plurality of rules 220 corresponding to the user selected options 202. The rule 220 corresponding to the user selected options 202 may then determine which pre-defined set of guide modules from among the plurality of modules 210 should be used to generate the customized guide materials 206.

The generation of customized guide materials 206 may be described as being "adaptive" because, e.g., generation of the customized guide materials adapts to the specific combination of options 202 selected by a user. Additionally, the guide modules 210 are independent, and therefore one guide module may be modified, or changed, without modifying, or changing, any of the other guide modules and without affecting the operation, or functionality, of any of the other guide modules. In addition, the rules 220 are also independent, and each rule may be modified, or changed, without modifying, or changing, any of the other rules and without affecting the operation, or functionality, of any of the other rules.

FIG. 11 is a conceptual diagram illustrating an exemplary graphical user interface 100 for providing customized guide materials including user selections in the "installation" category and the "rough opening" category. The guide materials generated thereby are shown in FIGS. 12A-12E (text/image content) and FIG. 13 (video content). More specifically, an exemplary textual and graphical guide generated by the selected options using the exemplary graphical user interface 100 of FIG. 11 is shown in FIGS. 12A-12E and an exemplary video guide generated by the selected options using the exemplary graphical user interface 100 of FIG. 11 is shown in FIG. 13.

The exemplary graphical user interface 100 of FIG. 11 is similar to the graphical user interfaces described herein with reference to FIGS. 4-9 and includes user selected options in the "Installation" category and the "Rough Opening Preparation" category." More specifically, as shown, under the "Installation" category, the "Framing Material" option is selected as "Wood," the "Product Family" option is selected as "Window," the "Wall" option is selected as "2×4," the "Window Type" option is selected as "Casement." Further, for the "Rough Opening Preparation" category, the "Wall" option is selected as "2×4," the "Shape" option is selected as "Rectangle," the "Sill Flashing Method" option is selected as "Flexible," and the "Weather Resistant Barrier" option is selected as "Pre-Window Install."

The exemplary systems and methods described herein may then generate customized guide material based on the user input information, in this example, the specific combination of user selected options presented on the graphical user interface 100 of FIG. 11. The customized guide materials may be presented using the graphical user interface 100. For example, as shown in FIG. 11, the graphical user interface 100 includes a document guide material region 150 entitled "Document" and a video guide material region 160 entitled "Video." Access to the customized guide materials may be provided within the document guide material region 150 and the video guide material region 160. For example, a user may click on, or otherwise select, one or both of Document region 150 or Video region 160 to access the customized guide materials.

In this example, each of the document guide material region 150 and the video guide material region 160 provides "links" 152, 162, respectively, to document guide material (e.g., text and/or graphics in a displayable and/or printable electronic document) and video guide material (e.g., video display on display apparatus). For example, if a user would like to view and/or print the document customized guide material, the user may select the link 152 within the document guide material region 150 to display the document customized guide material 300 as shown in FIGS. 12A-12E.

FIGS. 12A-12E are conceptual diagrams illustrating an exemplary customized textual and graphical guide 300 generated using the combination of user selected options shown in graphical user interface 100 of FIG. 11. As shown, the customized guide material 300 includes a plurality of guide modules combined to generate the customized guide materials 300 using the exemplary systems and methods described herein.

The guide modules may include portions, or segments, of guide materials that may be combined by the guide generator 204 to create customized guide materials based on the user input information. The plurality of guide modules may include alphanumeric text, graphics, images, electronic document pages, video segments, audio segments, subtitles for video, etc.

Figure 12A:
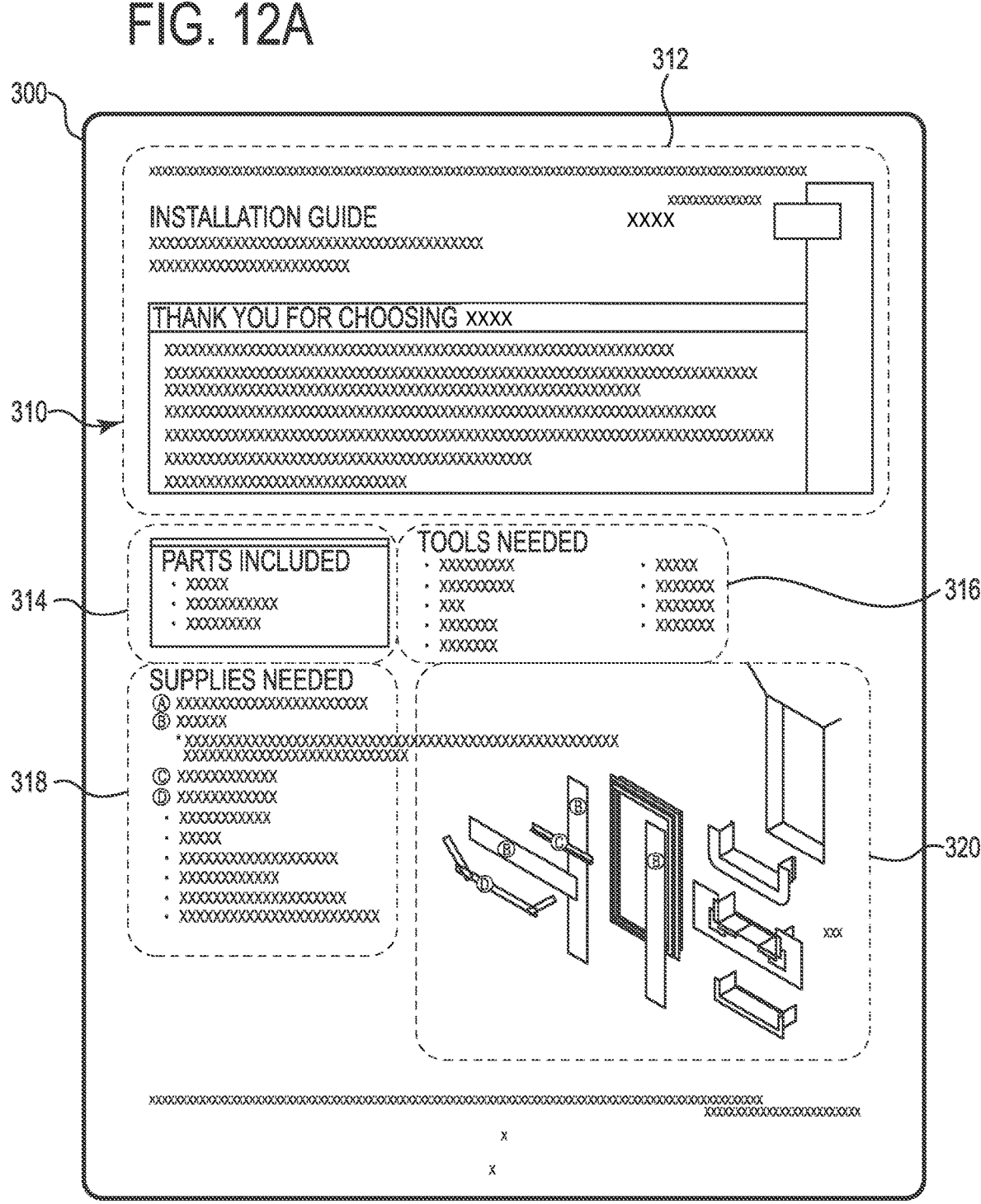
Figure 12C:
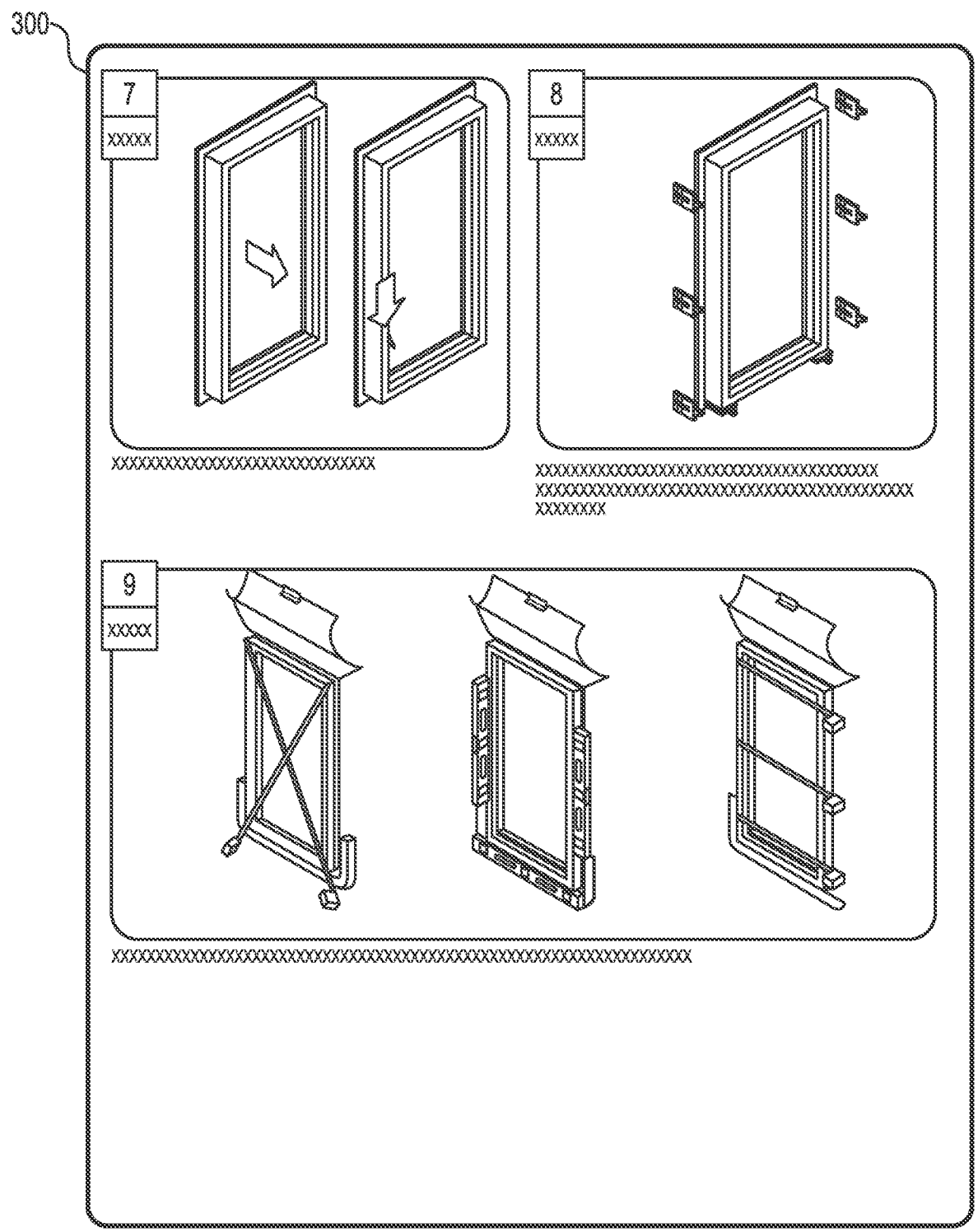
Figure 12D:
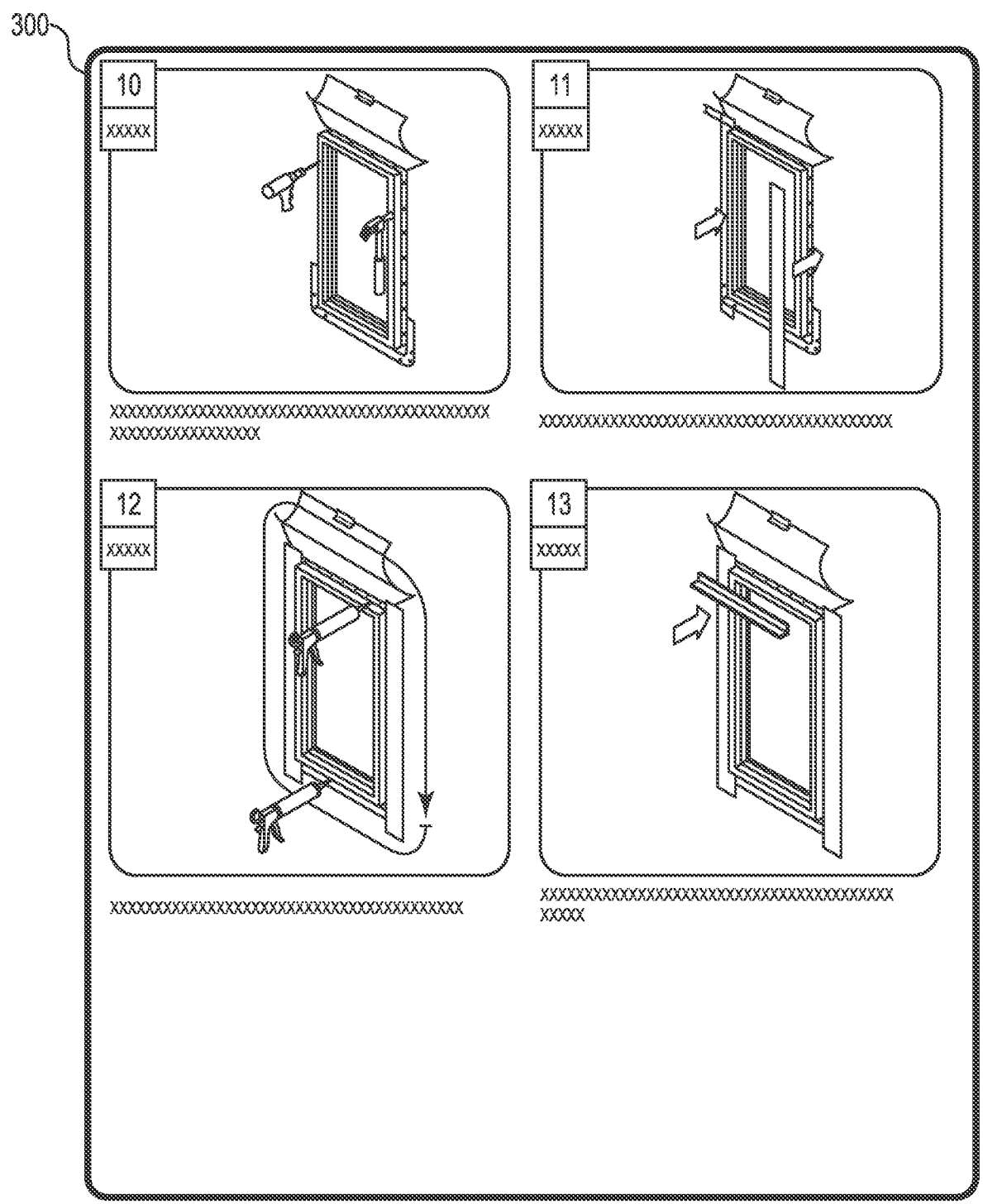
Figure 12E:
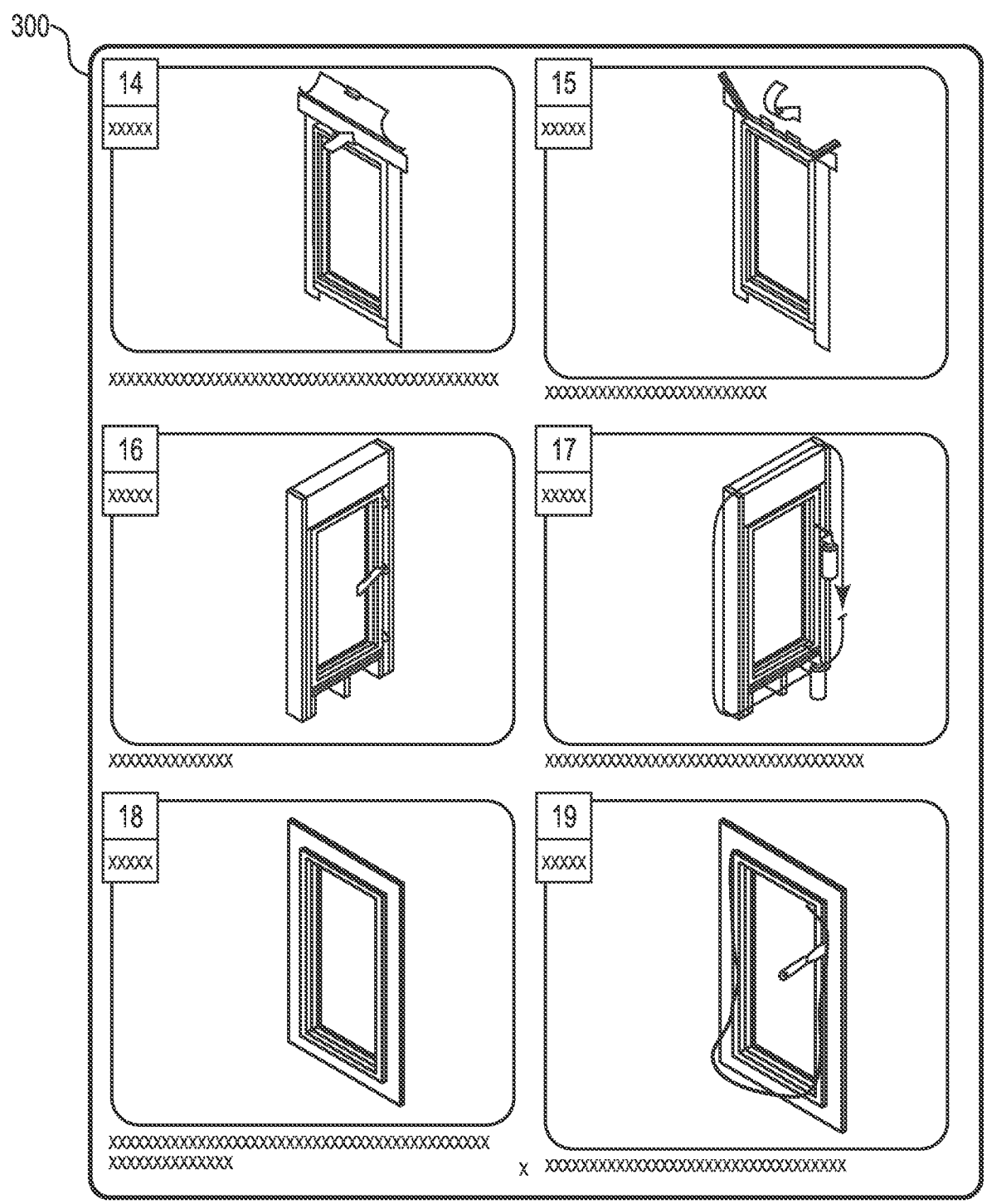
Figure 13:
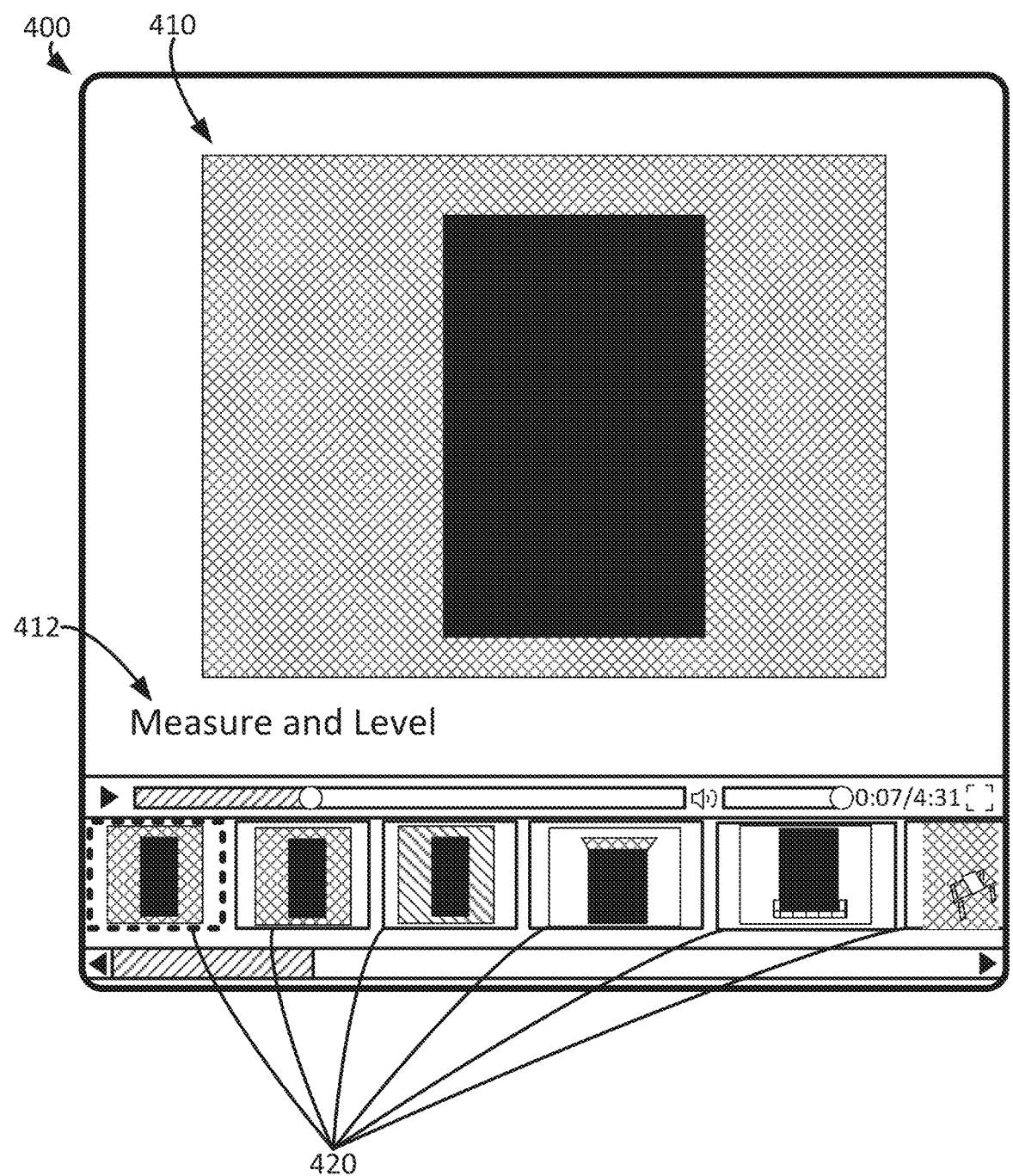
FIG. 13 is a conceptual diagram illustrating an exemplary customized video guide generated using the graphical user interface of FIG. 11.

In this example, customized guide materials 300 as shown on FIG. 12A includes guide modules 312, 314, 316, 318, and 320. Guide modules 312, 314, 316 and 320 are text-based guide modules, and guide module 320 is an image-based guide module. In this example, the user selected language is "English" and thus each of text-based guide modules 312, 314, 316, and 320 are presented in the "English" language. If the user selected language had been any other language, text-based guide modules 312, 314, 316 and 320 would be presented using the specified user selected language. However, guide module 320 is image-based and may therefore be presented for any user selected language.

Likewise, in FIG. 12B, image-based guide modules 322, 324, 326, 328, 330 and 332 may be presented for any user selected language, while the text-based guide modules 342, 344, 346, 348, 350, and 352 would be presented using the specified user selected language.

The guide modules in the customized guide materials may be presented as a sequence of steps, such as steps 1-19 shown in FIGS. 12B-12E. Each step is comprised of one or more guide modules from among the plurality of guide modules (such as guide modules 210 in FIG. 10). For example, "Title Page" step 310 of FIG. 12A includes guide modules 312, 314, 316, 318 and 320. As another example, "Step 1" of FIG. 12B includes guide module 322 and guide module 342 and "Step 2" of FIG. 12B includes guide module 324 and 326.

In this way, the system provides a flexible and modular guide material generation system, in which individual guide modules may be revised or updated without affecting the operation or functionality of any of the other guide modules.

The customized guide material 300 of FIGS. 12A-12E include those modules that guide a user in installing a rectangular rough opening in a 2×4 wall using the "flexible" sill flashing method and pre-window install weather resistant barrier and a casement window within the rough opening as shown by the user selected options in FIG. 11.

Figure 15A:
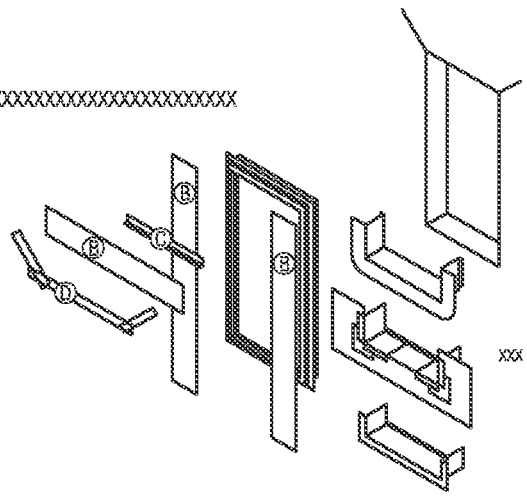
FIGS. 15A and 15B are conceptual diagrams illustrating an exemplary customized textual and graphical guide generated using the graphical user interface of FIG. 14.
Figure 15B:
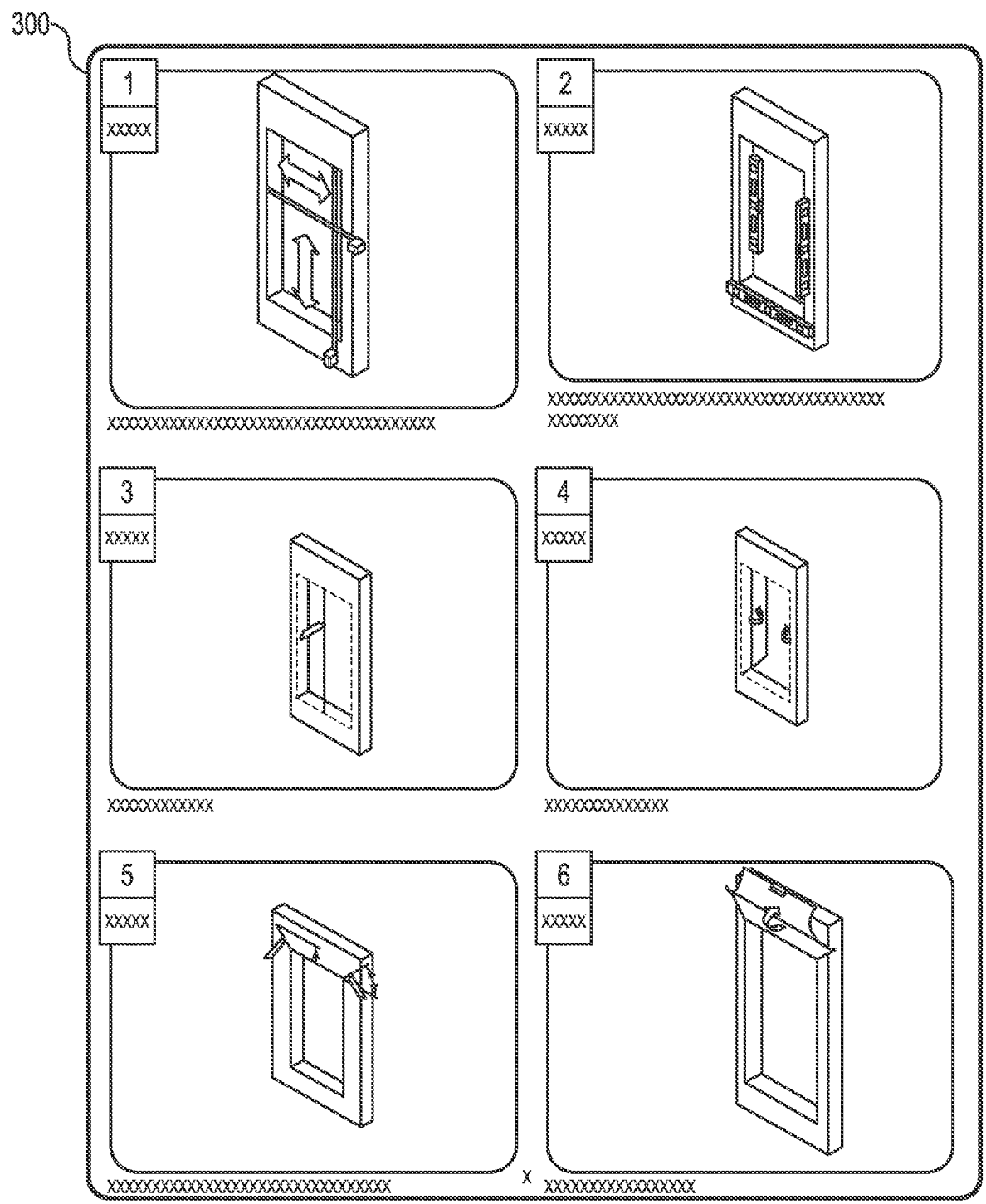
Figure 16:
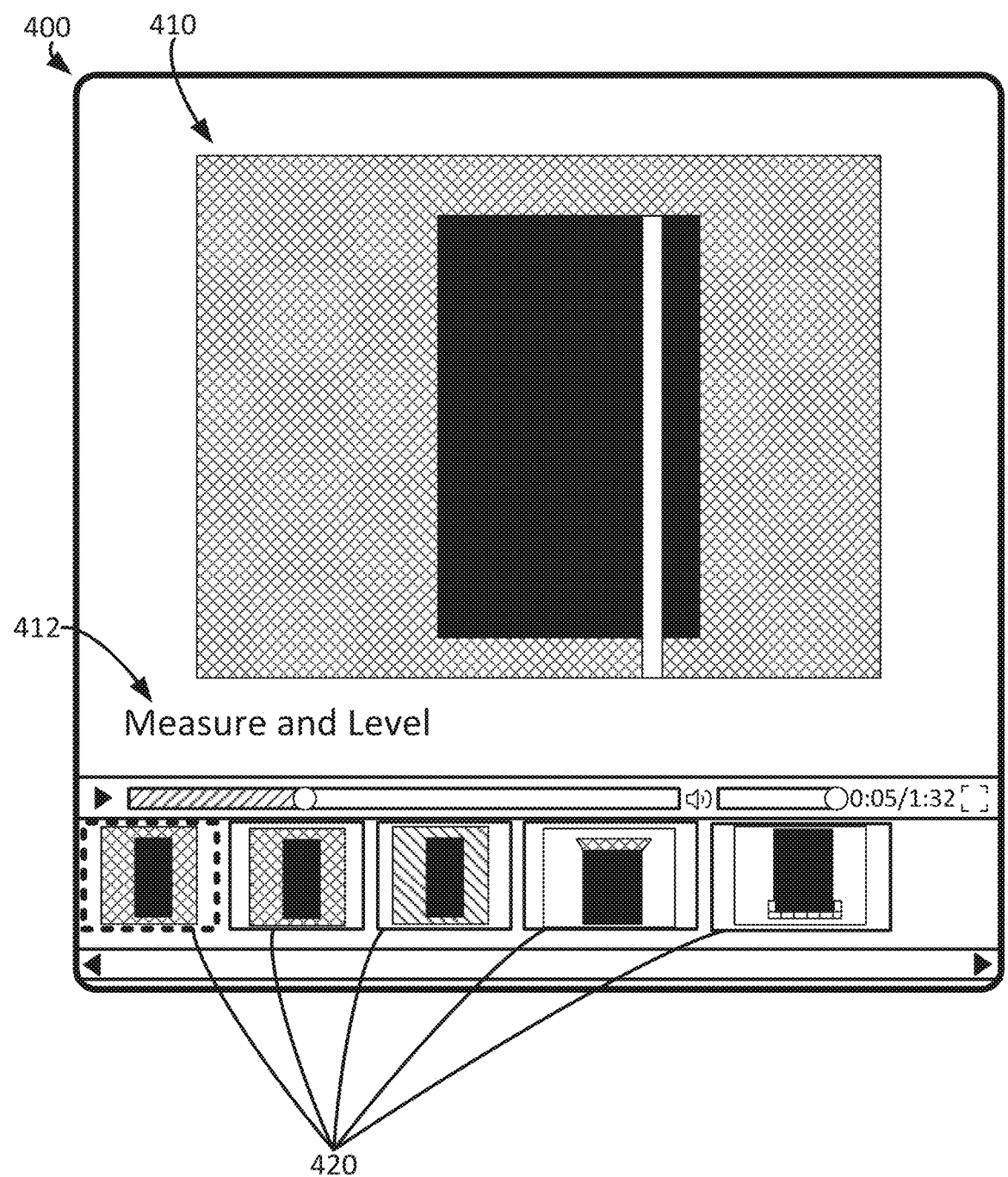
FIG. 16 is a conceptual diagram illustrating an exemplary customized video guide generated using the graphical user interface of FIG. 14.

If a user desires to only obtain the guide materials corresponding to the "Rough Opening Preparation" category, the user may select the options as shown in the exemplary graphical user interface 100 shown in FIG. 14. As shown, the "Wall" option is selected as "2×4," the "Shape" option is selected as "Rectangle," the "Sill Flashing Method" option is selected as "Flexible," and the "Weather Resistant Barrier" option is selected as "Pre-Window Install" for the "Rough Opening" guide category 120. Example customized guide materials which may be generated based on this user input information (e.g., user selected language, guide categories, options, etc.) are shown in FIG. 15A, FIG. 15B, and FIG. 16. The document guide material 300 of FIGS. 15A and 15B may be similar to the customized document guide material 300 of FIG. 12A-12E except the document guide material 300 of FIGS. 15A and 15B does not include the guide modules with respect to the window installation. Instead, the customized document guide material 300 of FIGS. 15A and 15B only include the guide modules with respect to the rough opening preparation due to the user selected options shown in FIG. 14.

FIGS. 13 and 16 include a guide video interface 400. The guide video interface 410 includes a video viewing window 410, a subtitle 412, and a plurality of video modules 420. As with the customized document guide materials, the customized video guide materials includes a plurality of guide modules that may be combined using the exemplary systems and methods described herein. Similar to the document guide material 300, the customized video guide material of FIGS. 13 and 16 only includes the guide modules that pertain to the combination of user selected options. In this example, the customized guide video of FIG. 13 may include video guide modules pertaining to both the rough opening preparation and window installation (corresponding to the example of FIG. 11) while the customized guide video of FIG. 16 only includes video modules pertaining to the window installation (corresponding to the example of FIG. 14).

In this example, customized video guide materials 410 of FIG. 13 are presented as one or more steps 420, wherein each step includes one or more guide modules from among the plurality of guide modules. For example, each step of a customized video guide may include corresponding video guide modules (which may include moving and/or still images), audio guide modules in the user selected language, text-based guide modules in the user selected language, etc.

In addition, a still image of at least some of the steps 420 may be presented on the graphical user interface 400. These may permit a user to "skip around" within the video or replay steps as desired.

The exemplary systems, methods, and interfaces described herein may further provide translation based on the selected language for one or more modules to be used to generate the guide materials. For example, guide modules may include text to be used in subtitles in video guide material, text to be used in audio instructions in video guide material, and/or text to be used in instructions in document guide material. The text may be stored in a primary language, e.g., English, and translated into a plurality of different languages other than the primary language.

When a user selects a language different than English, the exemplary systems and methods may use a translation function to translate the English text into the selected language to be used in the different modules to generate the customized guide materials. In at least one example, the translation may be described as being "on-the-fly" because the translation from the primary language to the target language may not occur until customized guide materials are generated from guide modules. In this way, any changes made to the text of the primary language may affect all of the guide materials (which, e.g., may save time when a change needs to be made to all guide materials).

Figure 17:
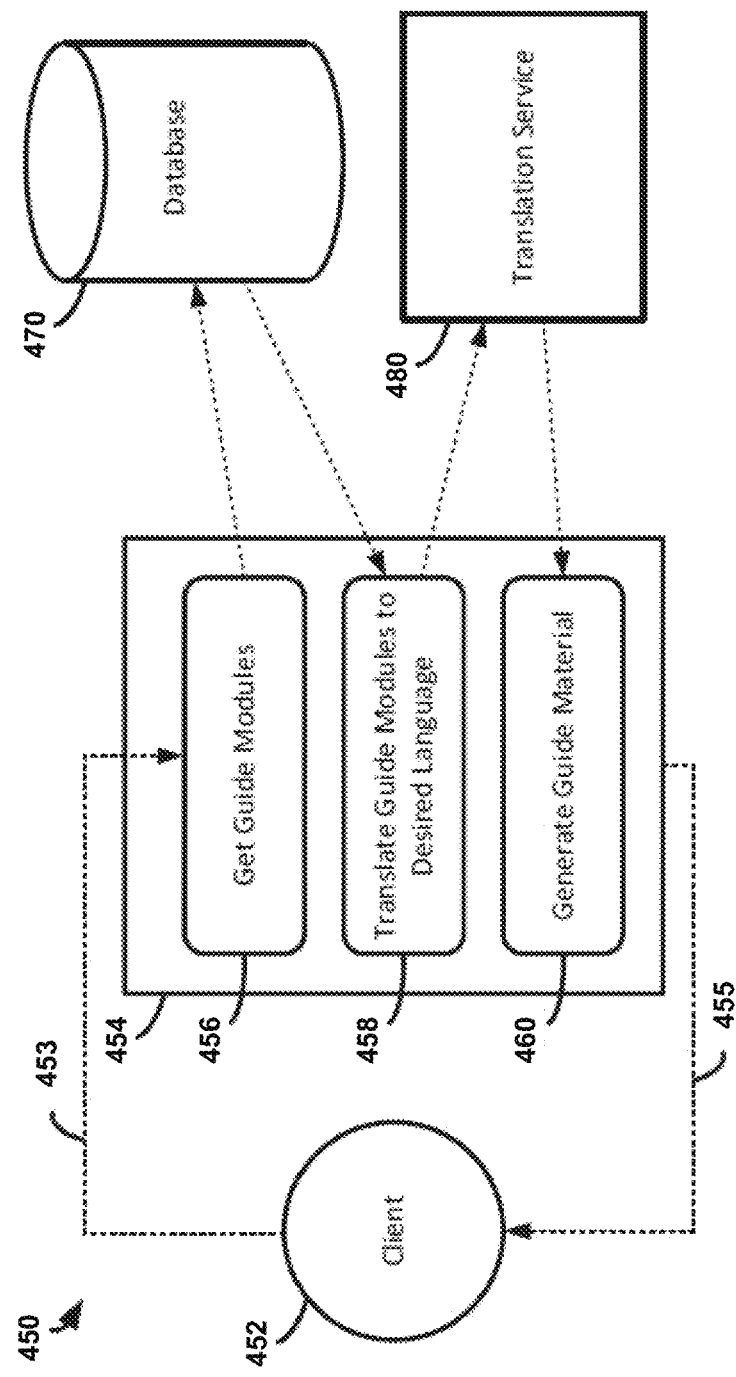
FIG. 17 is a block diagram illustrating an exemplary customized guide generation system and method including translation.

An exemplary customized guide generation system 450 and method including translation is depicted in FIG. 17. As a shown, a client 452 (e.g., a user using a computer or similar computing device) may use the exemplary user interfaces described herein to select one or more options used to generate guide materials. The selected options may be transmitted (453) to an exemplary guide generation system 454 to, e.g., request customized guide materials based on the selected one or more options.

The guide generation system 454 may get (e.g., select, obtain, etc.) the one or more guide modules 456 based on the selected one or more options (e.g., based on one or more rules programmed into the system 454). More specifically, the exemplary system 454 may obtain, or get, 456 the guide modules from a database 470 containing a plurality of guide modules as indicated by the arrow extending to and from the database 470.

The system 454 may translate the guide modules 458 obtained from the database 470 by sending the guide modules to a translation service 480 to be translated into the desired language. The translation service 480 may return the translated guide modules as indicated by the dotted line extending from the translation service 480 to the system 454 and the exemplary system 454 may generate the customized guide materials 460 based on the obtained guide modules 456 and the translated guide modules from the translation service. The customized guide materials may then be delivered 455 to the client 452.

Although the client 452, guide generation system 454, the database 470, and the translation service 480 are depicted in FIG. 17 as separate entities, it is be understood that each of the client 452, guide generation system 454, the database 470, and the translation service 480 may be on a single system and/or a plurality of systems. In at least one example, the translation service 480 and/or the client 452 may be located across a network such as e.g., the internet, from the guide generation system 454 similar to as described herein with respect to FIG. 2. The translation service 480 may include a text-to-audio translation and/or text-to-text translation, and may be described as being a text-to-audio translation generator and/or a text-to-text translation generator.

In other examples, rather than using a translation service to translate the customized guide modules from a base language, guide modules (such as guide modules 210 shown in FIG. 10) in each of the user-selectable languages may be stored.

Figure 18A:
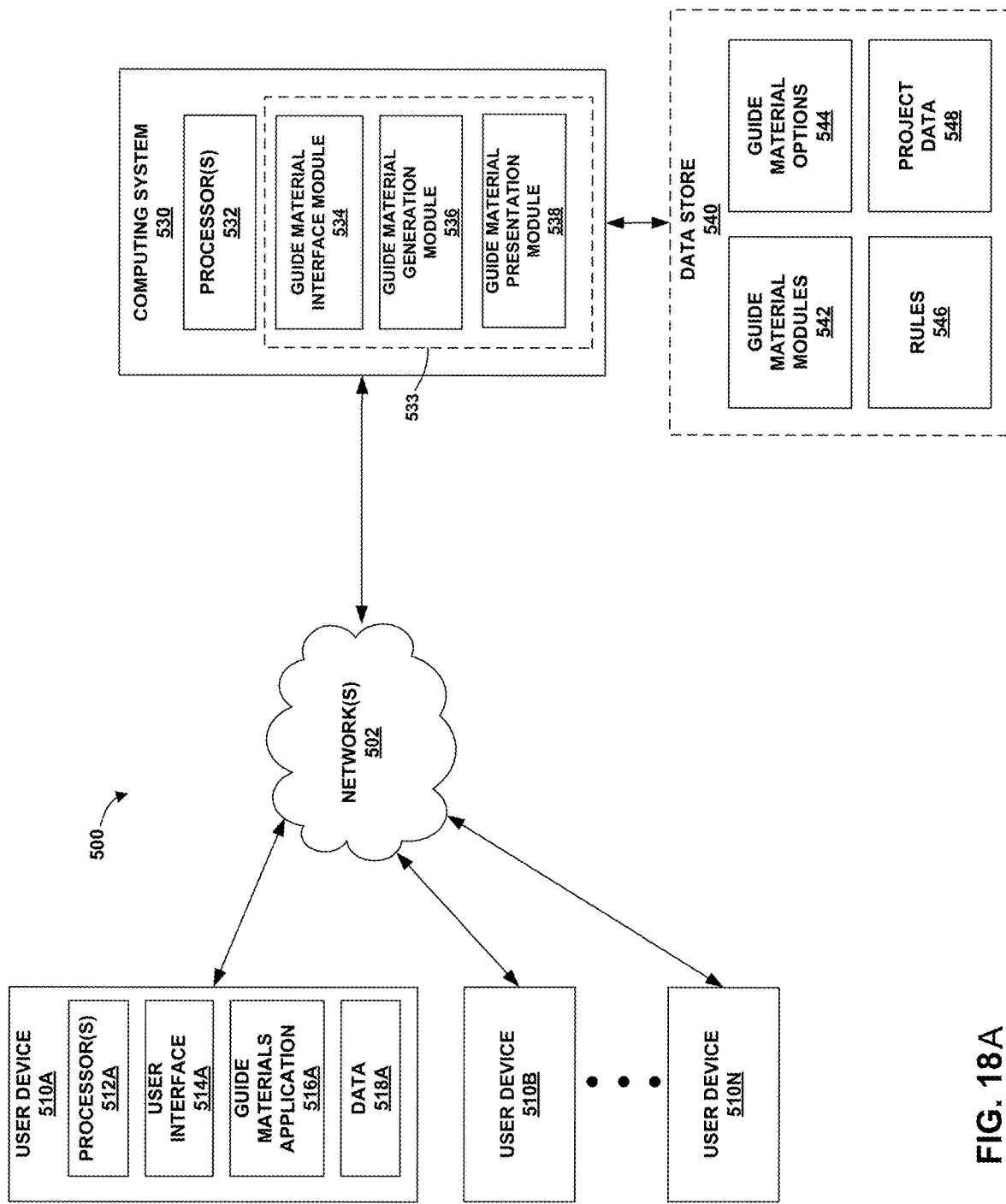
FIG. 18A is a block diagram illustrating an example computing system configured to generate customized guide materials based on user input information.

FIG. 18A is a conceptual diagram illustrating an example computing system 500 configured to generate customized guide materials based on user input information according to any of the methods described in this disclosure. System 500 includes one or more user computing devices or systems 510A-510N (hereinafter referred to as user devices 510A-510N) that are coupled via one or more network(s) 535 to one or more computing devices or systems 530 (hereinafter referred to as computing system 530).

Computing system 530 may be, for example, one or more remote servers or other computing systems capable of generating customized guide materials based on user input information as described herein. Network(s) 502 may include, for example, one or more of a dial-up connection, a local area network (LAN), a wide area network (WAN), the Internet, a cell phone network, satellite communication, or other means of electronic communication. The communication may be wired or wireless. Computing system 530 is coupled to user devices 510A-510N via network(s) 502 to receive user input information concerning one or more products. In the examples presented herein, the products are windows and/or doors, although it shall be understood that the disclosure is not limited in this respect. Computing system 530 may also send commands, instructions, software updates, etc. to each user device 510A-510N via network(s) 502. System 530 may receive data or otherwise communicate with the user devices 510A-510N on a periodic basis, in real-time, upon request of any of user devices 510A-510N, upon request of system 530, or at any other appropriate time.

User devices 510A-510N may include, but are not limited to, desktop computers, laptop computers, tablet computers, kiosk computers, servers, mainframes, portable or mobile computing devices such as mobile phones (including smartphones), wearable computing devices such as smart watches or computerized eyewear, cameras, personal digital assistants (PDAs), and any other type of computing device(s). User devices 510A-510N may also include a system of one or more such computing devices, or a combination of any such computing devices.

Each user computing device 510A-510N may include one or more processors, such as processor(s) 512A, for example, a graphical user interface such as graphical user interface 514A, for example, a guide materials application module such as guide materials application module 516A, for example, and data storage such as data storage 518A, for example. Each user interface 514A-514N may include components that are input-only (such as a physical keyboard, microphone, touch sensor, touchpad, camera, mouse, stylus, etc.), components that are output-only (electronic display, audio speaker, etc.), and/or some components that include both input and output functionality (touchscreen, etc.).

Each example guide materials application module 516A-516N is a software module that, when executed by processor(s) 512A-512N, respectively, permits a user, via graphical user interface 514A-514N, to enter user input information associated with one or more windows or doors to be installed, and to receive, and view, customized guide materials generated by system 530 based on the user input information. For example, guide materials application 516A-516N may provide a graphical user interface configured to receive input information concerning user selected language, guide material categories, options for each of the selected guide material categories, etc., and to display guide material generated based on the user input information, such as shown and described with respect to FIGS. 1-17.

Computing system 530 receives the user input information from the user devices 510A-510N via networks 502. The user input information received from user devices 510A-510N, as well as other data associated with the operation of the guide materials generation system 500, may be stored at a data store or other data storage media 540. Data store 540 may include, for example, guide material modules 542, guide material options 544, rules 546, and project data 548.

Guide material modules 542 may include, for example, a plurality of guide modules that may be individually selected and pieced together based on the user input information to generate customized guide materials specific to the options selected by the user. Guide material modules 542 may include, for example, a plurality of stored documentation guide modules (e.g., text and/or image content), audio guide modules (e.g., audio-only content) and/or video guide modules (e.g., video-only and/or video and accompanying audio content).

Guide material options 544 may include, for example, data concerning all of the possible user selectable options for the user input information (e.g., all possible user selected languages, guide categories, options for each of the guide categories, etc.). Rules 546 define the relationships between each specific combination of user selectable options 544 and one or more of the guide material modules 542. Each combination of options is related by one of the plurality of rules to a pre-defined set of guide modules from among the plurality of guide modules 210 that are relevant to that specific combination of options chosen by the user. Project data 548 may include, for example, one or more project files that store user input information received from user devices 510A-510N. Each project file may be stored in project data 548 along with an associated project identifier that uniquely identifies the project file, the user with whom the project is associated, the date and/or time the project file was created, and any other relevant information. Project data 548 may allow users of computing devices 510A-510N to retrieve or edit the user input information associated with a project, or to generate customized guide materials based on the stored project data at any time.

Computing system 530 includes one or more processors or computing devices 532 and storage media/data store 540. Storage media 533 includes a guide materials interface module 534, a guide materials generation module 536, and a guide materials presentation module 538. Although example computing system 530 is shown as a single computing system, it shall be understood that computing system may in other examples be implemented using one or more separate computing systems (separated logically and/or physically), and that the disclosure is not limited in this respect. For example, one computing system may execute and host the guide material interface module 534, presenting the guide material graphical user interface on user computing devices 510A-510N and receiving the user input information from user computing devices 510A-510N. Another computing system may execute the guide generation module 536, generating customized guide materials based on the user input information. Another computing system may execute the guide presentation module, which supports video playback of video format guide materials generated based on the user input information. Thus, it shall be understood that one or more computing systems may provide the functionality described with respect to computing system 530, and that the disclosure is not limited in this respect.

Likewise, data store 540 may be implemented using one or more separate storage media (separated either logically and/or physically) and it shall be understood that the disclosure is not limited in this respect.

Guide material interface module 534, when executed by one or more processors or computing devices 532, manages communication between the one or more user computing devices 510A-510N and computing system 530. For example, guide material interface modules generates the guide material interface (such as the guide material interface(s) described with respect to FIGS. 1-17) for presentation on a graphical user interface associated the one or more user computing devices 510A-510N. Guide material interface module 534 also receives the user input information input by a user via the guide material interface on the one or more user computing devices 510A-510N.

Data store 540 includes a plurality of guide material modules 542, guide material options 544, rules 546 and project data 548. Guide material modules 542 includes a plurality of guide modules, which may include stored documentation guide modules (e.g., text and/or image content), audio guide modules (e.g., audio-only content) and/or video guide modules (e.g., video-only and/or video and accompanying audio content). Guide material options 544 may include each of the possible user selectable options for the user input information (e.g., all possible user selected languages, guide categories, options for each of the selected guide categories, etc.).

Rules 546 define the relationships or associations between each possible combination of user selectable options, and the pre-defined set of guide modules corresponding to that combination of user selectable options. Each possible combination of options is related by one of rules 546 to a pre-defined set of guide modules from among the plurality of guide modules 542 that are relevant to that specific combination of options chosen by the user. For example, for the "English" language option and "Rough Opening Preparation" guide category option, and further for the "Wall" option "2×4," the "Shape" option "Rectangle," the "Sill Flashing Method" option "Flexible," and the "Weather Resistant Barrier" option "Pre-Window Install", rules 546 associates that particular combination of options and options with English language documentation and/or video guide modules (stored in guide material modules 542) that relate to rough opening preparation for rectangular-shaped windows in 2×4 wall construction, using a pre-window install weather resistant barrier and the flexible sill flashing method.

In use, computing system 530 executes guide material interface module 534 to generate the guide material graphical user interface for presentation on one or more of computing devices 510A-510N. A user, by interacting with graphical user interface, may input, or select, the user selectable options (the so-called "user input information", including the user) for which installation guide material is requested. The user selected options may be stored (along with an associated user name, project identifier, time and date stamps, etc.) in project data 548. The data may be encrypted for data security purposes.

Computing system 530 executes guide material generation module 536 to generate customized guide materials based on the user input information. To do this, computing system applies rules 546 to the user selected options (the user input information) to identify and select the associated guide material modules 542. Computing system 530 may generate documentation guides (e.g., text and/or image content), audio guides (e.g., audio-only content) and/or video guides (e.g., video-only and/or video and accompanying audio content), depending on the selections of the user. In some examples, computing system 530 builds the customized guide materials as a single document (such as in PDF or other document file format), or sequence of audio and/or video modules.

Computing system 530 further executes the guide material presentation module 538 to present the documentation, audio, and/or video customized guide materials to user computing devices 510A-510N. In the case of guide material documentation (text and/or image content), computing system may permit the user to view, print, or otherwise output the guide material documentation using user computing devices 510A-510N. In the case of audio and/or video formatted guide materials, guide material presentation module 538 may support audio and/or video playback of the customized guide materials on user computing devices 510A-510N. The customized guide materials generated by computing system 530 may also be stored in project data 538 (along with an associated user name, project identifier, time and date stamps, user selected language, user selected guide categories, user selected options for each of the selected guide categories, etc.). The data may be encrypted for data security purposes.

Figure 18B:
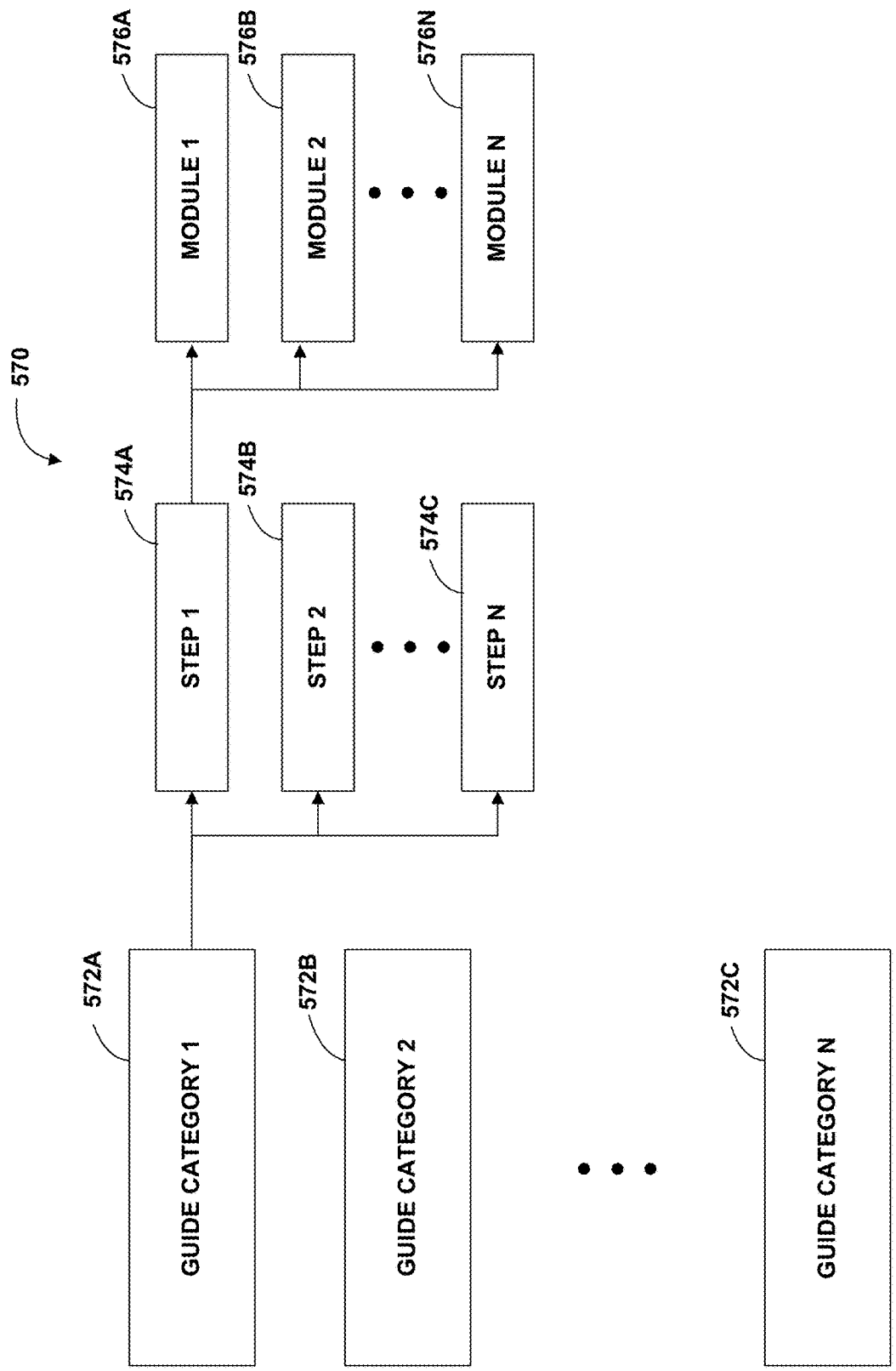
FIG. 18B is a conceptual diagram illustrating an example organization of the guide categories, the steps for each guide category, and the guide modules for each step.

FIG. 18B is a conceptual diagram illustrating an example organization of the guide categories, the steps for each guide category, and the guide modules for each step. Each guide category 572A-572N includes a defined sequence of steps, such as steps 574A-574N illustrated for guide category 572A. Each step 574A-574N includes one or more guide modules, such as steps 576A-576N illustrated for step 574A. The specific sequence of steps 574 for each guide category 572A-572N presented in the customized guide materials generated by the system are determined based on the user selected options. In other words, the specific sequence of steps and/or the number of steps for each guide category may change depending on the options selected by the user. Likewise, the guide modules 576 for each step 574 may change depending upon the user selected options.

Guide modules 576 are selected from among the plurality of guide modules (such as guide modules 210 in FIG. 10) depending upon the user input information. For example, each step may include video, audio, or text/image-based guide modules for the user selected guide categories in the user selected language. For each guide category selected by the user, the customized guide materials may include those steps that are relevant to the user selected options, and further may include those guide modules that are relevant to the user selected options.

As one example, "Title Page" step 310 of FIG. 12A includes guide modules 312, 314, 316, 318 and 320. As another example, "Step 1" of FIG. 12B includes guide module 322 and guide module 342 and "Step 2" of FIG. 12B includes guide module 324 and 326. As another example, the currently displayed step of the customized video guide 410 of FIG. 13 includes the video module currently being shown in the window, a "Measure and Level" title module 412, a still frame module for each of steps 420, and a module for the navigation elements (e.g. slider bar, etc.).

At least some of the plurality of steps and/or guide modules may apply to more than one user selectable option. In other words, each step may be used for any combination of user selectable options, and because each guide module may be used for any number of steps, the total number of steps as well as the total number of guide modules that needs to be created and stored may be reduced. The system thus may help to provide flexibility in that each individual step and/or guide module may be revised or updated, or steps and/or guide modules may be added or deleted, without affecting any of the other steps and/or guide modules. In addition, the system may help reduce data storage requirements as significantly less storage space is needed as compared to systems in which there is a one-to-one correspondence between the number of possible combinations of options and the steps for each guide category, and/or to systems in which unique steps and unique guide modules corresponding to each unique step must be stored for each possible combination of user selectable options.

Figure 19:
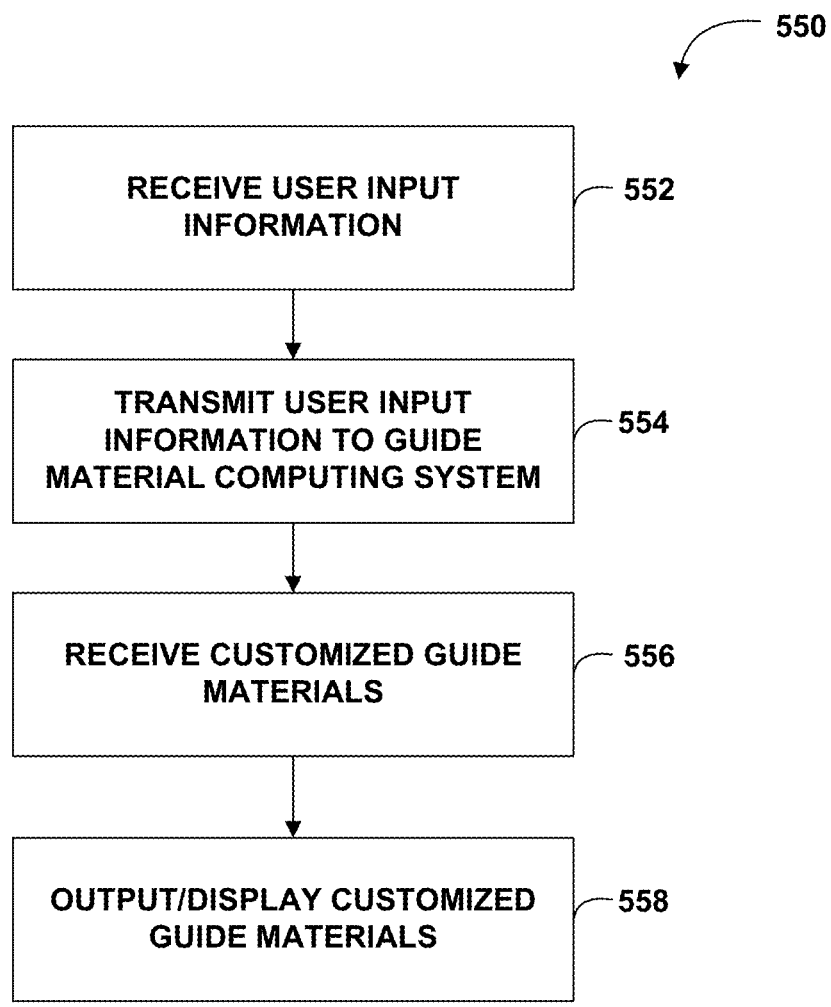
FIG. 19 is a flow diagram illustrating an example process by which a user computing device may receive user input information and receive and display customized guide materials generated based on the user input information.

FIG. 19 is a flow diagram illustrating an example process (550) by which a user computing device, such as one of user computing devices 510A-510N as shown in FIG. 18A, may receive user input information and receive and display customized guide materials generated based on the user input information.

User devices 510A-510N receive user input information including, for example, a user selected language, one or more user selected guide categories, and user selected options for each of the selected guide categories, associated with one or more door or window units or any other product for which guide materials may be generated (552). The computing device may receive some or all of the user input information as manually entered by a user through a graphical user interface presented on the user computing device. For example, the computing device 510 may present a graphical user interface configured to receive user input information concerning the one or more door or window units. Alternatively or in addition, the computing device may receive the user input information in the form of uploaded project data from a local or remote storage device. The user input information may include any information related to the door or window units, and may include data concerning a single unit or may include data concerning a plurality of units associated with a single project. The user input information may include one or more of a user selected language in which to generate the customized guide materials, one or more guide categories, and one or more options for each of the selected guide categories. For example, the user selectable options for guide material category may include care and maintenance, installation, rough opening preparation, service and warranty, or any other type of guide material category relevant to the product or products for which customized guide materials are being generated. The user selectable options may include identification of the door or window units for which customized guide materials are being requested (e.g., the types, names, or identifiers of the doors and windows or other products for which customized guide materials are being generated). As another example, the user selectable options may include one or more characteristics of, or corresponding to, the door or window units, such as a vertical dimension, a horizontal dimension, a color, a material type, a window type, a door type, a shape, one or more building material features (e.g., type of wall construction), one or more siding features (e.g., type, color, shape, size, etc.), or any other information relevant to the product for which customized guide materials are being generated.

The computing device transmits the user input information to, for example, a guide materials computing system (such as computing system 530 in FIG. 18A (554), which generates customized guide materials based on the user input information. The computing device receives the customized guide materials (556). For example, the computing device may receive customized guide materials in document form (e.g., text and/or image content), audio form (e.g., audio-only content) and/or video form (e.g., video-only and/or video and accompanying audio content). The computing device may display the customized guide materials (558). For example, if the customized guide materials are in document form, computing device may display the customized guide materials using a graphical user interface (such as shown with respect to FIGS. 15A and 15B), allow a user to download, print, save, or otherwise output some or all of the customized guide materials. As another example, if the customized guide materials are in audio and/or video form, the computing device may present the video or audio guide materials using a graphical user interface (such as shown with respect to FIG. 16), permit a user to download the audio and/or video guide materials, etc.

Figure 20:
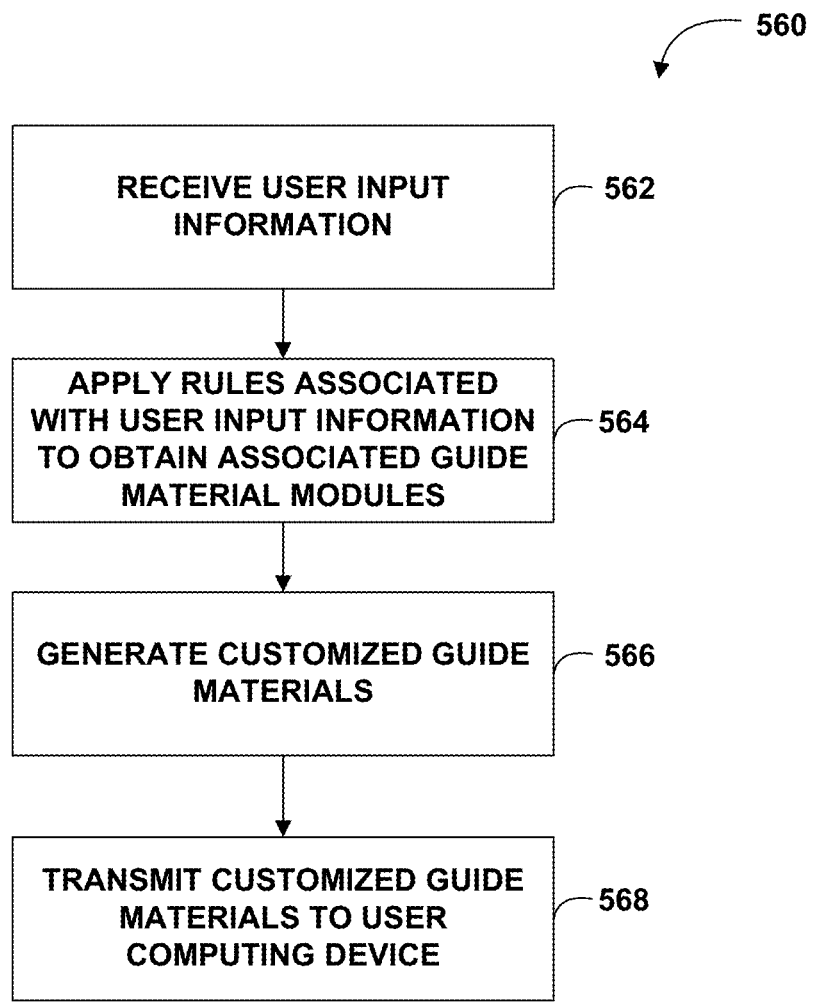
FIG. 20 is a flow diagram illustrating an example process by which a computing device may generate customized guide materials based on user input information.

FIG. 20 is a flow diagram illustrating an example process (560) by which a computing device or system, such as computing system 530 as shown in FIG. 18A, may generate customized guide materials based on user input information.

The computing device receives user input information associated with one or more door or window units (562). As described herein, the user input information may include, for example, a user selected language, one or more user selected guide categories, and one or more options for each of the selected guide categories associated with one or more door or window units.

The computing device applies one or more rules (such as rules 220 as shown in FIG. 10 or rules 546 as shown in FIG. 18A) to the user input information to identify the associated guide material modules (such as guide material modules 210 as shown in FIG. 10 or guide material modules 542 as shown in FIG. 18A) corresponding to the combination of user selected options (564). The computing device then generates the customized guide materials using the identified guide modules (566). The guide materials may include documentation guides (e.g., text and/or image content), audio guides (e.g., audio-only content) and/or video guides (e.g., video-only and/or video and accompanying audio content), depending on the selections of the user. In some examples, computing system builds the customized guide materials may be generated as a single document (such as in PDF or other document file format), audio guide and/or video guide depending upon the selections of the user.

The computing system further (such as by executing guide material presentation module 538 as shown in FIG. 18A) transmits the documentation, audio, and/or video customized guide materials for presentation on the appropriate user computing device(s) (568). In the case of guide material documentation (text and/or image content), this may include permitting the user to view, print, or otherwise output the guide material documentation using one or more user computing devices. In the case of audio and/or video formatted guide materials, this may include audio and/or video playback of the customized guide materials on one or more user computing devices.

Figure 21:
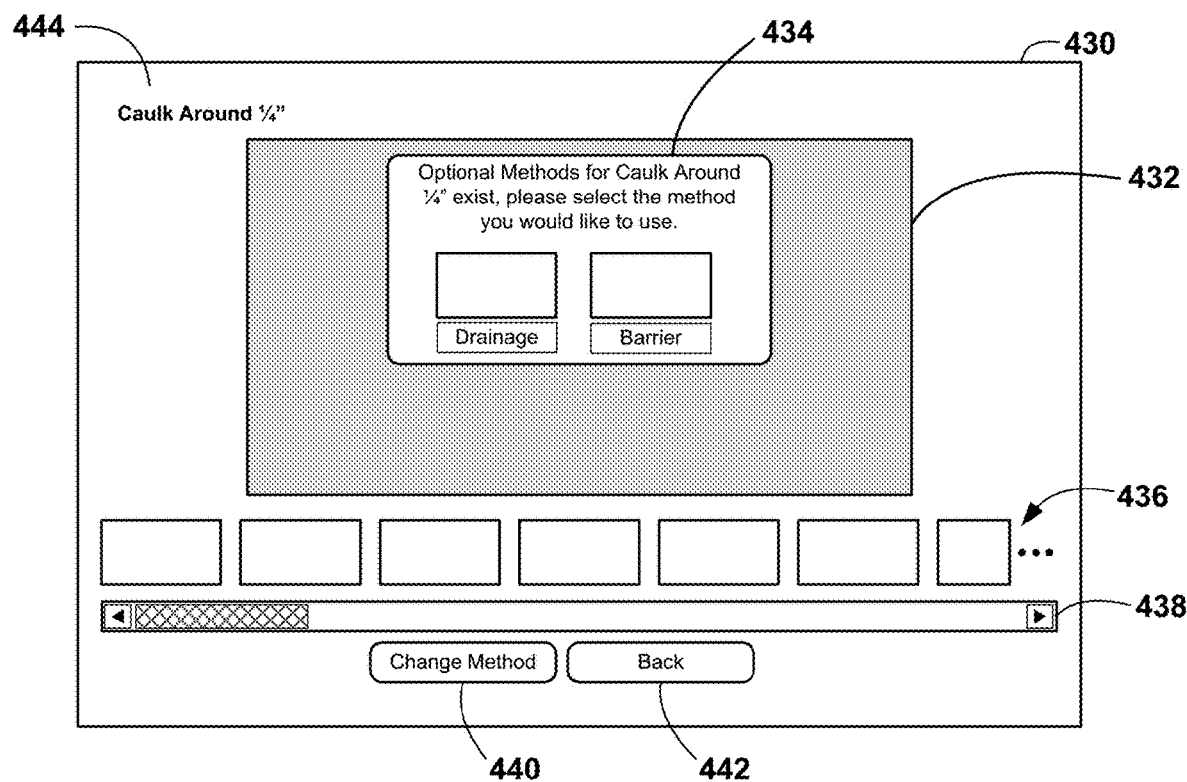
FIG. 21 is a screen shot of an example customized video guide showing an interactive pop-up window.

FIG. 21 is a screen shot of an example graphical user interface 430 on which an example customized video guide is displayed. In the example of FIG. 21, a step entitled "Caulk Around ¼" (as indicated by title 444) of the customized video guide is currently playing in an active window 432 of graphical user interface 430. Graphical user interface 430 also displays a still frame from each of a plurality of steps 436 in the customized video guide. A user may view any step 436 in the customized video guide by clicking on or otherwise selecting the still frame of the desired step 436. Operation of slider bar 438 allows a user to view additional steps 436 that may be not be visible on graphical user interface 430. The user may navigate the customized video guide by viewing the entire customized video guide in its entirety. In that case, the guide modules associated with each step 436 are played sequentially. In another example, the user may skip around by selecting individual step, or steps, they would like to view, or may replay any step of the customized video guide as desired.

In some situations, there may be alternative procedures for achieving a particular end result. In addition, there may be some flexibility in terms of allowing a user to choose which alternative they would like to view and/or use. However, it may also be desirable to allow the user to view guide materials pertaining to all/both of the alternatives if they so desire. For example, with respect to the installation of doors and/or windows, there may be alternative procedures or sets of instructions for performing certain steps of the installation process. In some such examples, the customized video guide may display an interactive pop-up window that includes two or more alternatives from which a user may select. In other examples, the customized video guide may present some other mechanism for presenting two, or more, alternatives from which a user may select. In the example of FIG. 21, interactive pop-up window 434 as displayed on graphical user interface 430 displays two user selectable alternatives, in this example "Drainage" or "Barrier" alternatives for the "Caulk Around ¼" module. Selection of one of the alternatives by the user will cause the customized video guide to playback the video modules associated with the user selected alternative. For example, if the user selected the "Drainage" alternative in interactive pop-up window 434, graphical user interface would display the "Drainage" video module corresponding to "Caulk Around ¼". Alternatively, if the user selected the "Barrier" alternative in interactive pop-up window 434, graphical user interface would display the "Barrier" video module corresponding to "Caulk Around ¼".

The user may select the desired alternative by clicking on, or otherwise selecting, the still frame or the text associated with the desired selection. Graphical user interface 430 may further display a "Change Method" button 440 and/or a "Back" button 442. By clicking on, or otherwise selecting, "Change Method" button 440, a user may navigate to the video module corresponding to the alternative selection presented in the pop-up window. By clicking on or otherwise selecting the "Back" button 442, a user may navigate back to the previously played video module.

In this example, customized video guide displayed in user interface 430 may include guide modules defining the text presented in pop-up window 434, the images presented for each of the alternatives, the text associated with each of the alternatives (e.g., "Drainage" and "Barrier", the title 444, the still images representing each step 436, the slider bar 438, the Change Method button 440, and Back button 442. One of the plurality of rules (such as rules 546 in FIG. 18A) corresponding to the specific combination of user selected options identifies the pre-defined set of guide modules (such as guide modules 542 in FIG. 18A) from which to generate the customized guide materials.

All patents, patent documents, and references cited herein are incorporated in their entirety as if each were incorporated separately. This disclosure has been provided with reference to illustrative examples and is not meant to be construed in a limiting sense. As described previously, one skilled in the art will recognize that other various illustrative applications may use the techniques as described herein to take advantage of the beneficial characteristics of the systems and methods described herein. Various modifications of the illustrative examples, as well as additional examples of the disclosure, will be apparent upon reference to this description.

The techniques described in this disclosure may be implemented, at least in part, in hardware, software, firmware, or any combination thereof. For example, various aspects of the described techniques may be executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together, or separately, as discrete but interoperable logic devices. Depiction of different features as modules or units is intended to highlight different functional aspects and does not necessarily imply that such modules or units must be realized by separate hardware, firmware, or software components. Rather, functionality associated with one or more modules, or units, may be performed by separate hardware, firmware, or software components, or integrated within common, or separate, hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Various examples have been described. These and other examples are within the scope of the following claims.

What is claimed is:

1. A method of generating customized guide materials associated with a product, comprising:
    receiving, by a computing device, user input information associated with the product, the user input information including one or more user selected options from among a plurality of user selectable options;
    storing, in a data storage media, a plurality of guide modules, wherein each of the plurality of guide modules includes at least one of text, image, audio or video guide information corresponding to the product,
    storing, in a data storage media, a plurality of rules, wherein each rule in the plurality of rules corresponds to a different pre-defined set of two or more of the plurality of guide modules, and wherein at least one rule in the plurality of rules relates more than one combination of the plurality of user selectable options with the corresponding pre-defined set of two or more of the plurality of guide modules;
    identifying, by the computing device, one of the plurality of rules corresponding to the one or more user selected options;
    identifying, by the computing device, the pre-defined set of two or more of the plurality of guide modules corresponding to the identified one of the plurality of rules; and
    generating, by the computing device and for display on a user computing device, the customized guide materials from the identified pre-defined set of two or more of the plurality of guide modules.

2. The method of claim 1 further comprising transmitting the customized guide materials to the user computing device.

3. The method of claim 1 further comprising generating, for display on the user computing device, a graphical user interface configured to present the plurality of user selectable options and to receive the plurality of user selected options.

4. The method of claim 1 wherein the plurality of user selectable options include a language option.

5. The method of claim 1 wherein the plurality of user selectable options include a guide category.

6. The method of claim 1 wherein the product includes a window or a door, and wherein the plurality of user selectable options include at least one of a product identifier, a window type, a door type, a shape, a wall construction type, and a framing material type.

7. The method of claim 1 further comprising: generating an interactive pop-up window for presentation on a graphical user interface associated with the user computing device, the interactive pop-up window configured to receive a user selected installation alternative associated with the product; and
    upon receipt of the user selected installation alternative, outputting, for presentation on the graphical user interface associated with the user computing device, a video guide step associated with the user selected installation alternative, wherein the video guide step includes installation instructions specific to the user selected installation alternative.

8. The method of claim 1 wherein the product includes one of a door or a window.

9. The method of claim 1 wherein the customized guide materials comprise an installation guide video.

10. The method of claim 1 wherein the customized guide materials comprise a document including text and graphical content.

11. A computing system configured to generate customized guide materials associated with a product, comprising:
    one or more processors configured to receive user input information associated with the product, the user input information including one or more user selected options from among a plurality of user selectable options;
    storage media configured to store a plurality of guide modules, wherein each of the plurality of guide modules includes at least one of text, image, audio or video guide information corresponding to the product,
    the storage media further configured to store a plurality of rules, wherein each rule in the plurality of rules corresponds to a different pre-defined set of two or more of the plurality of guide modules, and wherein at least one rule in the plurality of rules relates more than one combination of the plurality of user selectable options with the corresponding pre-defined set of two or more of the plurality of guide modules;
    the one or more processors further configured to:
    identify one of the plurality of rules corresponding to the one or more user selected options, identify the pre-defined set of two or more of the plurality of guide modules corresponding to the identified one of the plurality of rules, and
    generate, for display on a user computing device, the customized guide materials from the identified pre-defined set of two or more of the plurality of guide modules.

12. The computing system of claim 11 wherein the plurality of user selectable options includes a user selectable language and a plurality of user selectable guide categories.

13. The computing system of claim 11 wherein the product includes a window or a door, and wherein the plurality of user selectable options include at least one of a product identifier, a window type, a door type, a shape, a wall construction type, and a framing material type.

14. The computing system of claim 11 wherein the one or more processors are further configured to generate, for display on the user computing device, a graphical user interface configured to present the plurality of user selectable options and to receive the plurality of user selected options.

15. The computing system of claim 14 wherein the user computing device is located remotely from the one or more processors.

16. A non-transitory computer readable medium encoded with instructions that cause one or more processors of a computing device to perform operations comprising:
    receive user input information associated with the product, the user input information including one or more user selected options from among a plurality of user selectable options;
    store a plurality of guide modules, wherein each of the plurality of guide modules includes at least one of text, image, audio or video guide information corresponding to the product, store a plurality of rules, wherein each rule in the plurality of rules corresponds to a different pre-defined set of two or more of the plurality of guide modules, and wherein at least one rule in the plurality of rules relates more than one combination of the plurality of user selectable options with the corresponding pre-defined set of two or more of the plurality of guide modules;

identify one of the plurality of rules corresponding to the one or more user selected options;

identifying the pre-defined set of two or more of the plurality of guide modules corresponding to the identified one of the plurality of rules; and generate, for display on a user computing device, the customized guide materials from the identified pre-defined set of two or more of the plurality of guide modules.

17. A computing system configured to generate customized guide materials associated with a product, comprising:

means for receiving, by a computing device, user input information associated with the product, the user input information including one or more user selected options from among a plurality of user selectable options;

storage media configured to store a plurality of guide modules, wherein each of the plurality of guide modules includes at least one of text, image, audio or video guide information corresponding to the product, the storage media further configured to store a plurality of rules, wherein each rule in the plurality of rules corresponds to a different pre-defined set of two or more of the plurality of guide modules, and wherein at least one rule in the plurality of rules relates more than one combination of the plurality of user selectable options with the corresponding pre-defined set of two or more of the plurality of guide modules;

means for identifying one of the plurality of rules corresponding to the one or more user selected options, and identifying the pre-defined set of two or more of the plurality of guide modules corresponding to the identified one of the plurality of rules; and means for generating, for display on a user computing device, the customized guide materials from the identified pre-defined set of two or more of the plurality of guide modules.

18. The computing system of claim 11 wherein the plurality of rules relate each one of the plurality of guide modules to more than one combination of the one or more user selected options.

19. The computing system of claim 11 wherein the one or more processors are further configured to generate, for display on the user computing device, a guide generation region, and present a user selectable information within the guide generation region, and further to present the customized guide materials within the guide generation region.

20. The method of claim 1 further comprising providing a link on a graphical user interface to download the customized guide materials.

21. The method of claim 1 wherein the plurality of user selectable options comprises at least one category option, wherein the at least one category option comprises at least one of a care and maintenance category, an installation category, a rough opening preparation category, a service and warranty category, a removal category, an accessories category, a hardware options category, and a joining category.

22. The method of claim 21 wherein each of the at least one category options comprises a plurality of sub-options, wherein the plurality of sub-options for the care and maintenance category comprise one or more of a product family sub-option, a product series sub-option, and a product type sub-option.

23. The method of claim 21 wherein each of the at least one category options comprises a plurality of sub-options, wherein the plurality of sub-options for the installation category comprise one or more of a framing material sub-option, a product family sub-option, a wall type sub-option, and a product type sub-option.

24. The method of claim 21 wherein each of the at least one category options comprises a plurality of sub-options, wherein the plurality of sub-options for the rough opening preparation category comprise one or more of a wall type sub-option, an opening shape sub-option, a flashing method sub-option, and a weather resistant barrier sub-option.

25. The method of claim 21 wherein each of the at least one category options comprises a plurality of sub-options, wherein the plurality of sub-options for the service and warranty category comprise one or more of a product series sub-option, a product family sub-option, and a product type sub-option.

26. The method of claim 1 wherein the plurality of user selectable options comprises a language type option.

27. The method of claim 26 wherein generating the customized guide materials includes generating textual instructions corresponding to a selected language type option for the guide materials using a text-to-text translation generator.

28. The method of claim 26 wherein generating the customized guide materials includes generating auditory instructions corresponding to a selected language type option for the guide materials using a text-to-audio translation generator.

29. The method of claim 1 wherein the user computing device is located remotely from the computing device.

* * * * *